May 15, 1962  E. J. ROTH ET AL  3,034,455
ENDLESS AUTOMATIC PROOFER AND/OR COOLER
COMBINED WITH A DOUGH FORMER
Filed Sept. 21, 1959  15 Sheets-Sheet 1
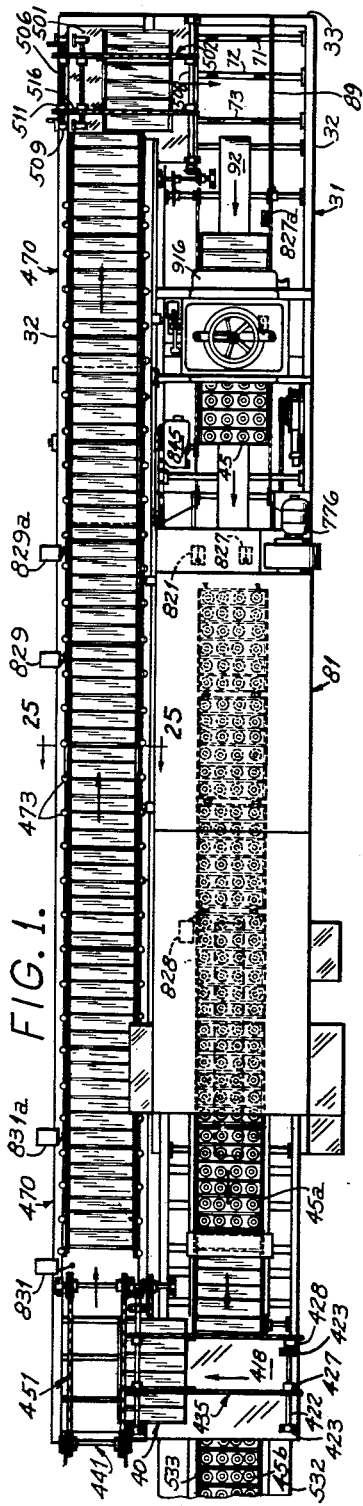
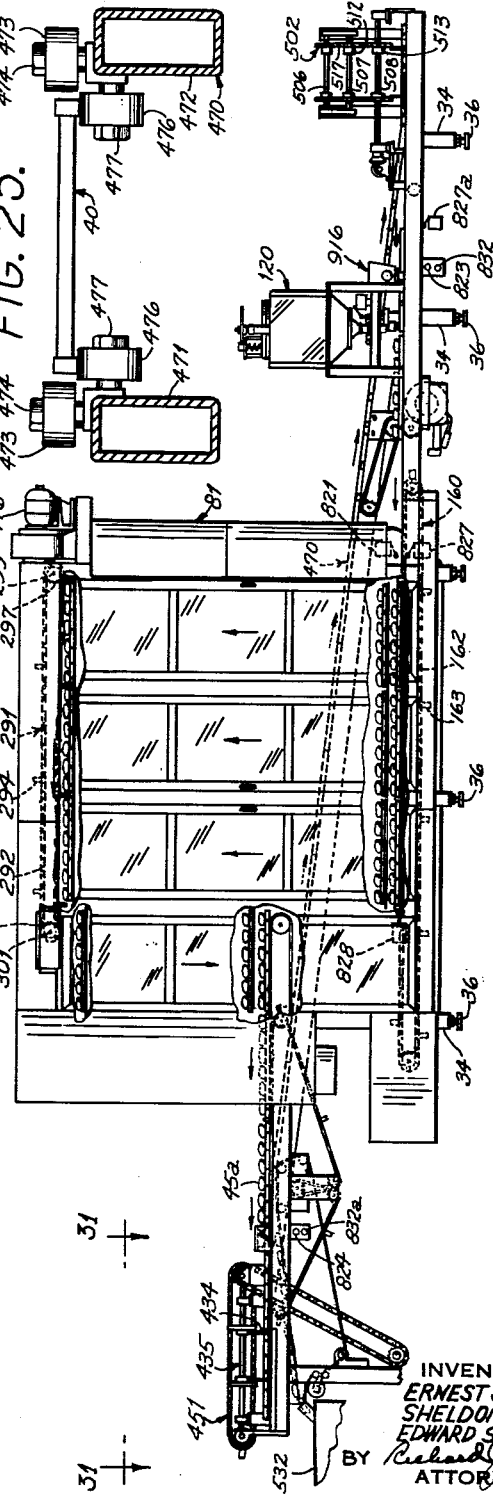
INVENTORS
ERNEST J. ROTH
SHELDON DALE
EDWARD SCHWERT
BY Richard Newton
ATTORNEY

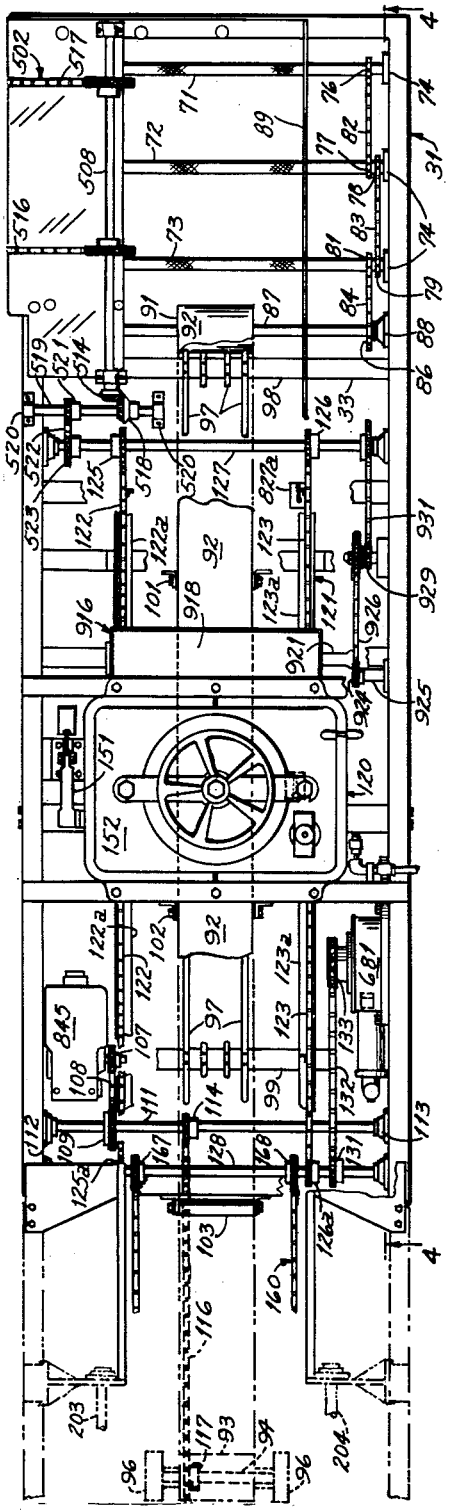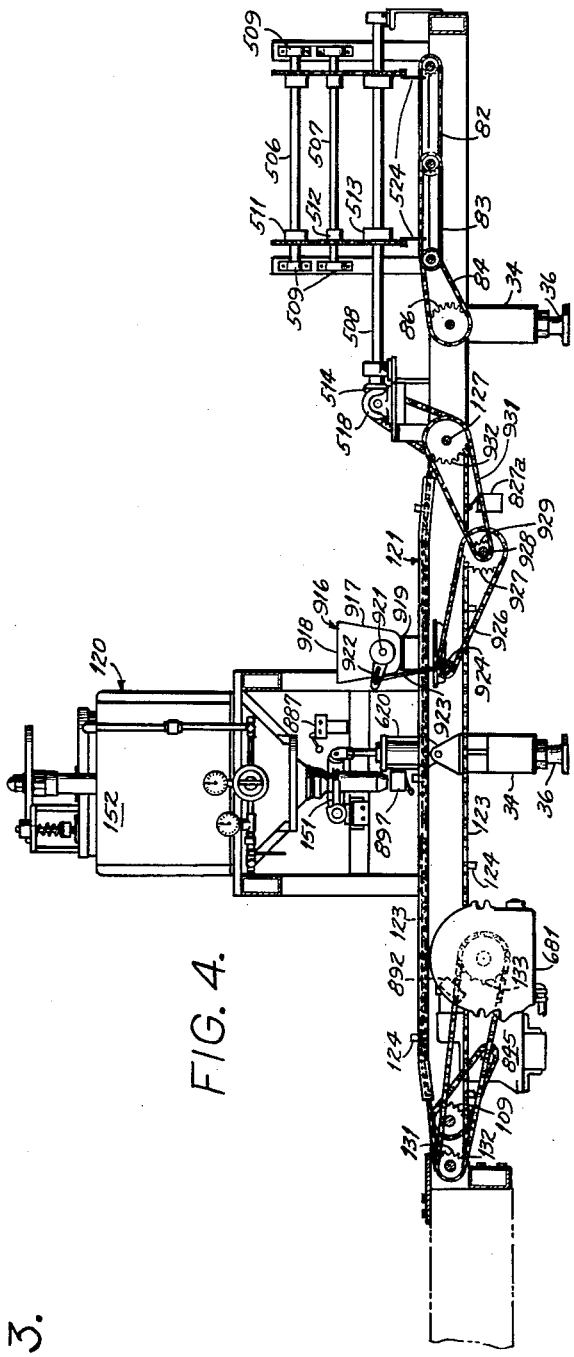

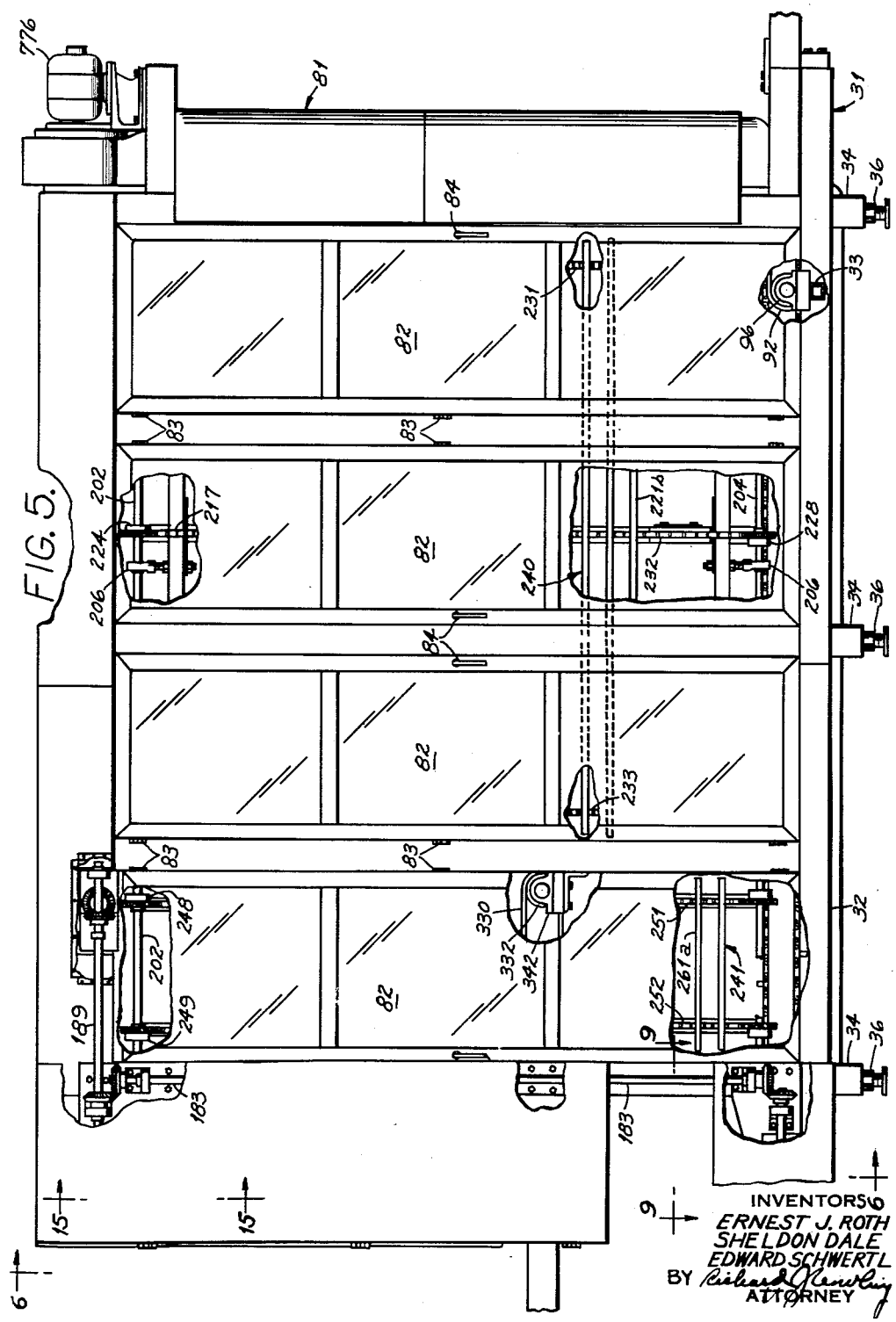

May 15, 1962 E. J. ROTH ET AL 3,034,455
ENDLESS AUTOMATIC PROOFER AND/OR COOLER
COMBINED WITH A DOUGH FORMER
Filed Sept. 21, 1959 15 Sheets-Sheet 4

INVENTORS
ERNEST J. ROTH
SHELDON DALE
EDWARD SCHWERTL
BY Richard Newling
ATTORNEY

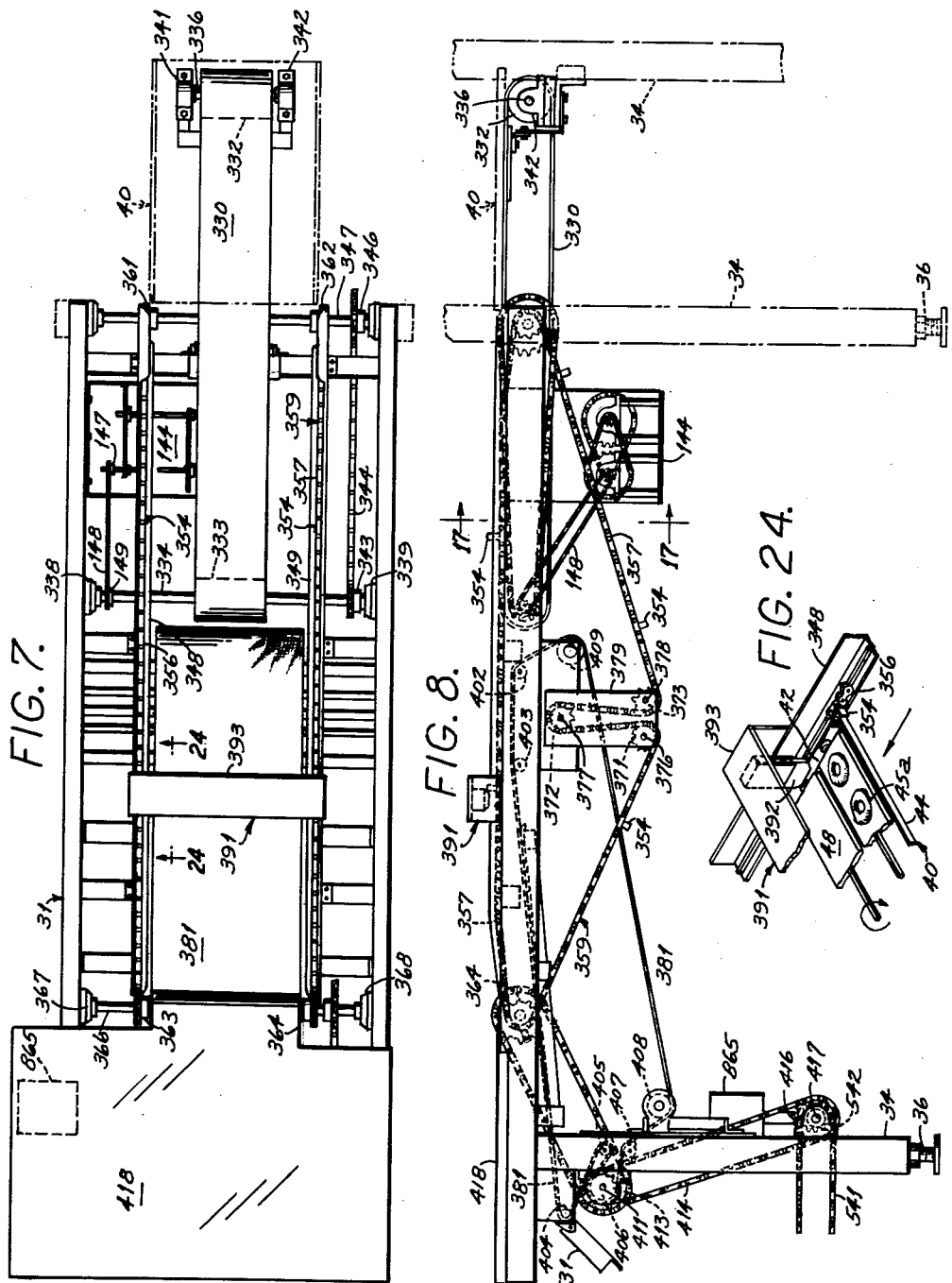

May 15, 1962
E. J. ROTH ET AL
3,034,455
ENDLESS AUTOMATIC PROOFER AND/OR COOLER
COMBINED WITH A DOUGH FORMER
Filed Sept. 21, 1959
15 Sheets-Sheet 7
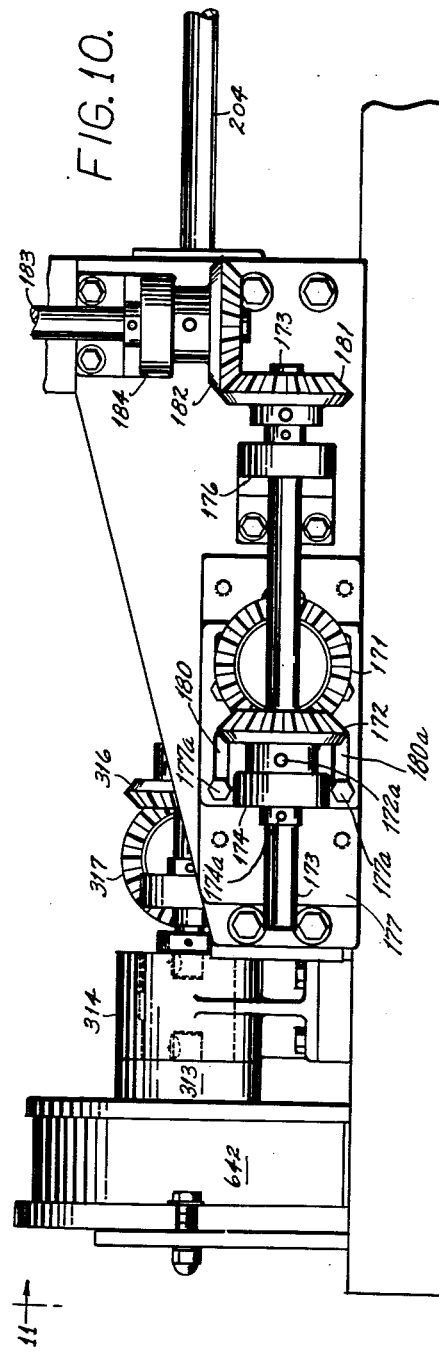
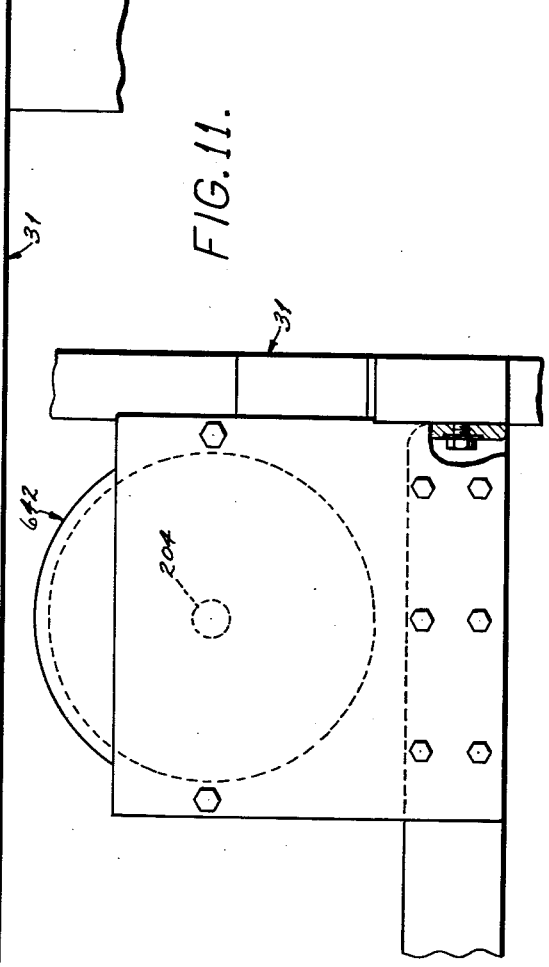
INVENTORS
ERNEST J. ROTH
SHELDON DALE
EDWARD SCHWERTL
BY Richard Newling
ATTORNEY INVENTORS
ERNEST J. ROTH
SHELDON DALE
EDWARD SCHWERTL
BY Richard Rawling
ATTORNEY

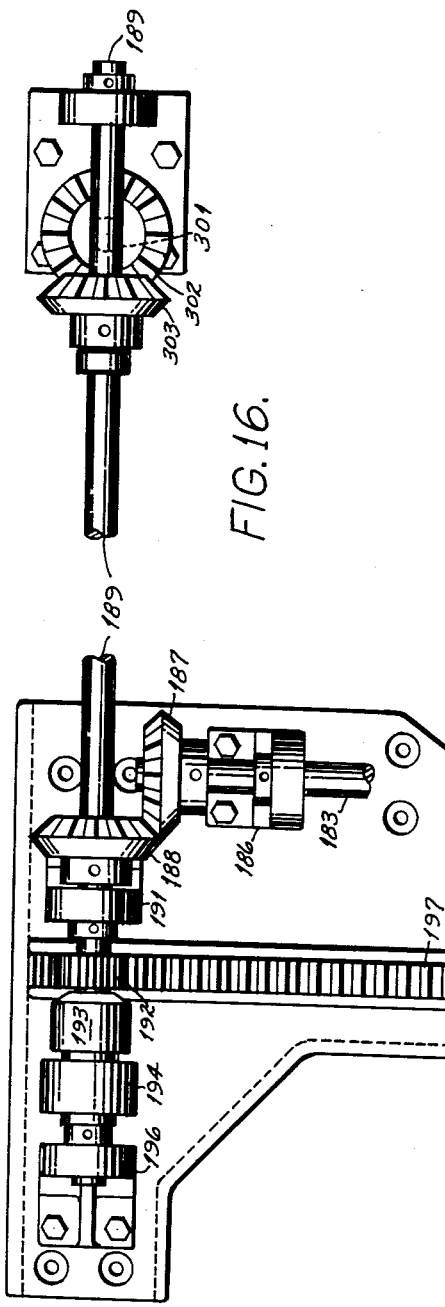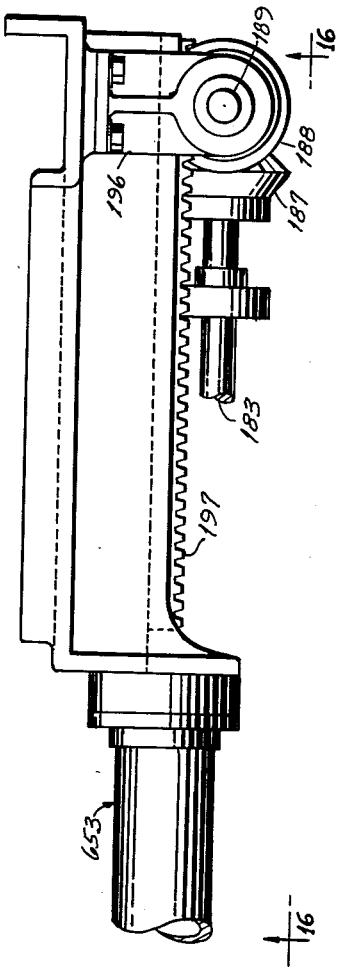
FIG.16.
FIG.15.
INVENTORS
ERNEST J. ROTH
SHELDON DALE
EDWARD SCHWERTL
BY
ATTORNEY

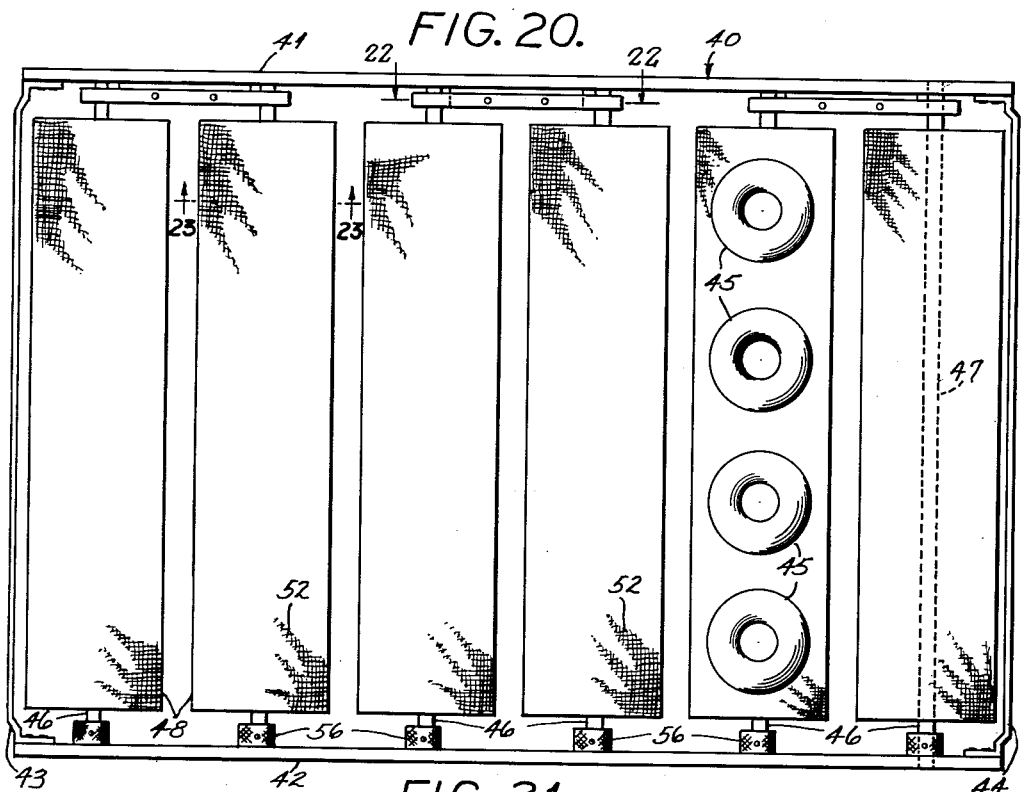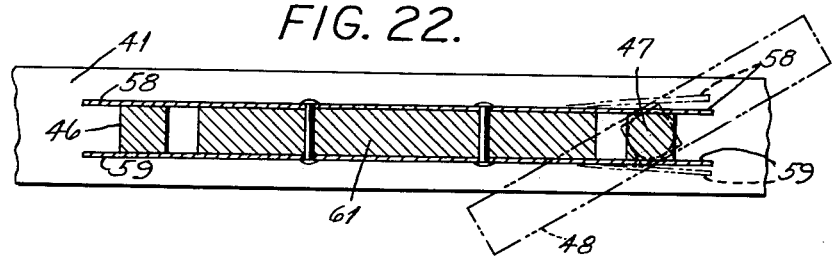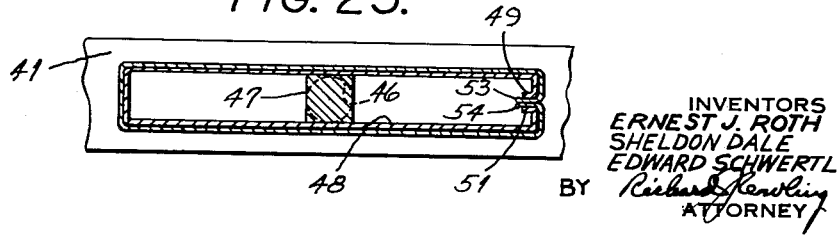

May 15, 1962  E. J. ROTH ET AL  3,034,455
ENDLESS AUTOMATIC PROOFER AND/OR COOLER
COMBINED WITH A DOUGH FORMER
Filed Sept. 21, 1959  15 Sheets-Sheet 14
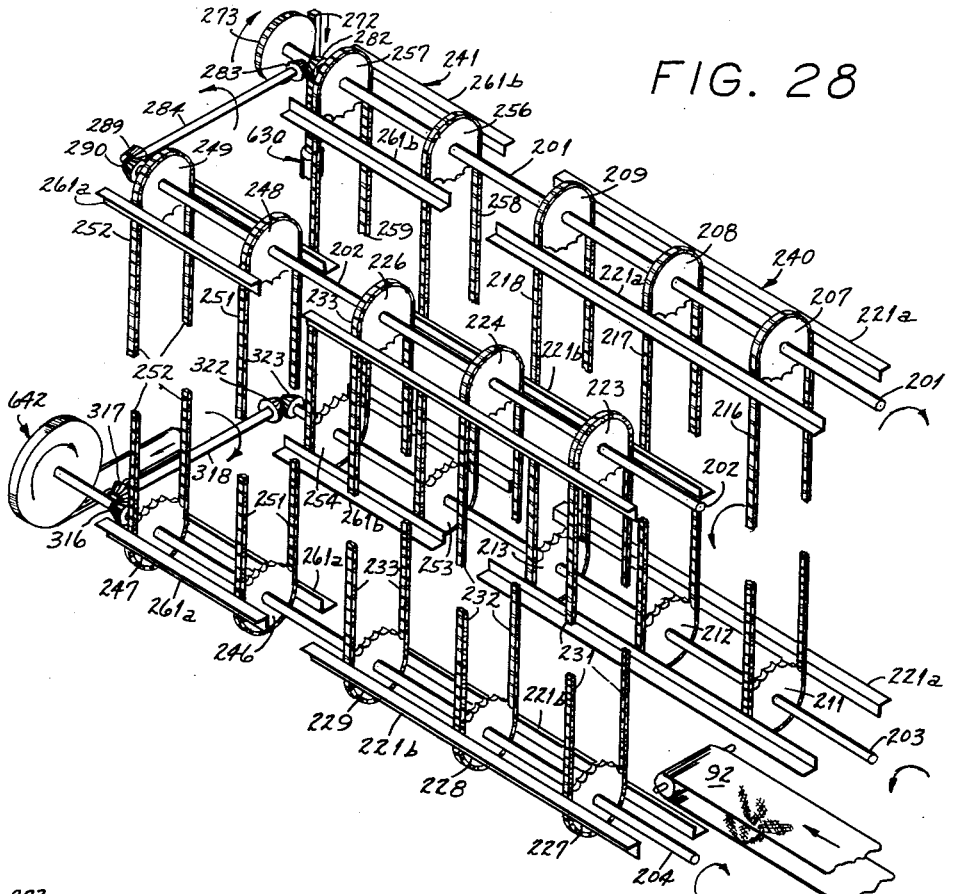
FIG. 28
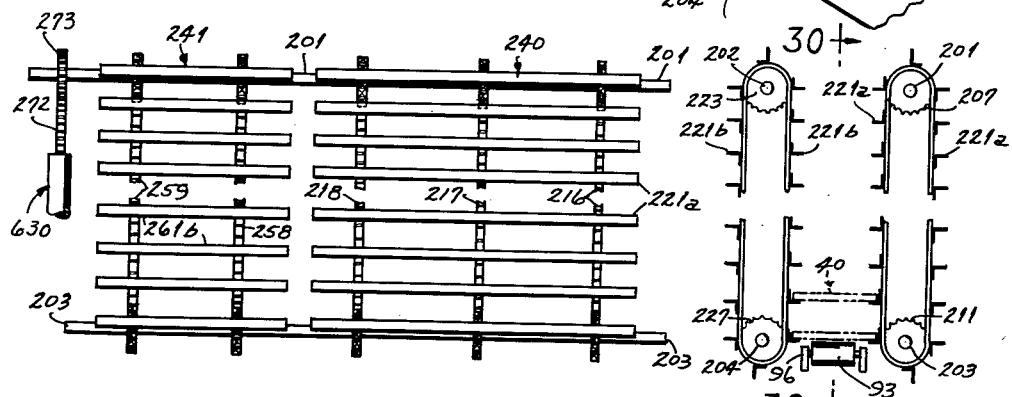
FIG. 30
FIG. 29
INVENTORS
ERNEST J. ROTH
SHELDON DALE
EDWARD SCHWERTL
BY
ATTORNEY May 15, 1962
E. J. ROTH ET AL
3,034,455
ENDLESS AUTOMATIC PROOFER AND/OR COOLER
COMBINED WITH A DOUGH FORMER
Filed Sept. 21, 1959
15 Sheets-Sheet 15
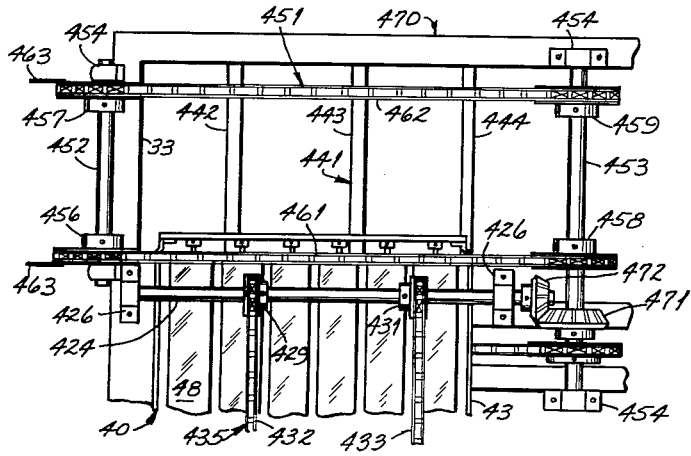
FIG. 31.
FIG. 19.
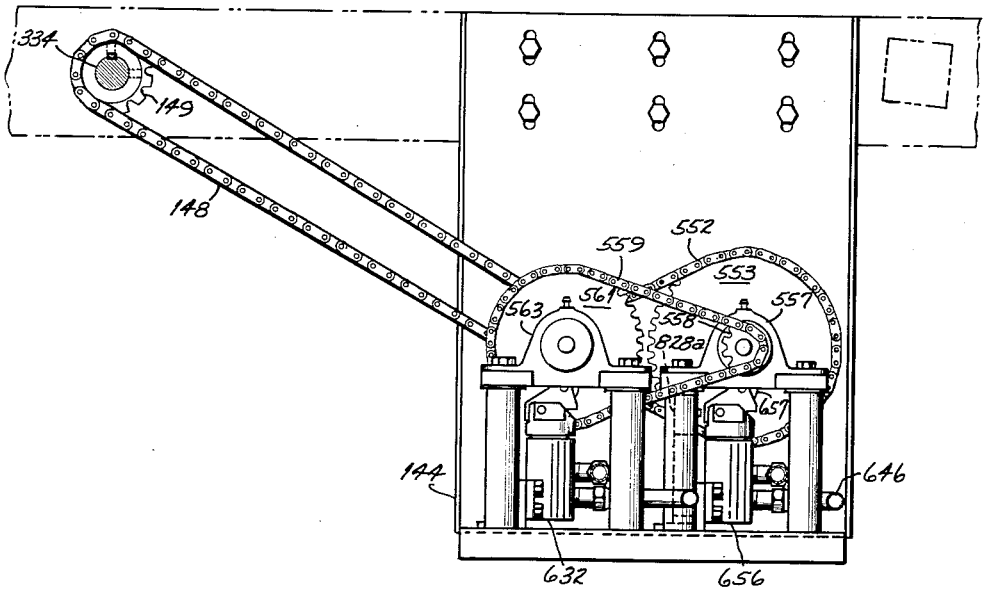
INVENTORS
ERNEST J. ROTH
SHELDON DALE
EDWARD SCHWERTL
BY Richard Remling
ATTORNEY

United States Patent Office 3,034,455
Patented May 15, 1962

3,034,455
ENDLESS AUTOMATIC PROOFER AND/OR COOLER COMBINED WITH A DOUGH FORMER
Ernest J. Roth, Rockleigh, N.J., and Sheldon Dale, New York, and Edward Schwertl, New Hyde Park, N.Y., assignors to Joe Lowe Corporation, New York, N.Y., a corporation of Delaware
Filed Sept. 21, 1959, Ser. No. 841,213
6 Claims. (Cl. 107—4)

The present invention relates generally to a proofing and/or cooling machine, and it has particular relation to a proofer or cooler in combination with a dough former that is adapted for handling bakery articles, and especially yeast raised doughnuts and like products.

Yeast raised doughnuts have within recent years developed into a sizeable business, which had previously been limited because of the difficulties involved in making them in large quantities efficiently and economically. For a long time there was no satisfactory former capable of producing automatically yeast raised doughnuts in large quantities because conventional formers failed to cut dough forms from yeast raised dough of a consistent volume. When this bottleneck had been overcome, the extra handling of the freshly cut dough forms necessitated by the proofing period made them too costly to compete satisfactorily with the conventional cake doughnut. The raw dough forms had to be placed on trays, which were stacked on trucks, and then moved into a proofing room. After the necessary proofing period, the trucks had to be removed manually from the proofing room, and then the proofed dough forms had to be deposited manually into the cooking oil of a cooking vessel.

The present invention eliminates this tedious method of handling the raw dough forms into and out of the proofing room, with its resultant expense and difficult handling problems, thereby eliminating the inherent last bottleneck in the manufacture of yeast raised doughnuts.

With the present invention, the raw dough forms are deposited by a series of aligned formers onto especially designed trays, having a series of transversely extending slats spaced longitudinally thereof, the number of raw forms deposited on each transverse slat being dependent upon the width of the tray and the number of formers used. The trays are moved longitudinally and intermittently under the row of formers, and a dough form from each former is deposited on each transverse slat of the tray in spaced relation. When all of the slats are filled with raw dough forms, the tray is moved away from under the formers and a new tray is moved into position under the formers for the purpose of being filled with raw dough forms. The trays are moved forwardly along a conveyor into an ascending elevator, which raises them upwardly in vertically spaced rows. When the uppermost tray reaches the top of the ascending elevator, it is moved or shifted forwardly onto a descending elevator. The time required to move through the ascending and descending elevators, which are mounted within a dust-proof chamber, is sufficient to complete the necessary proofing. As the lowermost descending tray reaches its bottom level of the descending elevator, it is moved or shifted forwardly onto another horizontal conveyor, which carries it forwardly and away therefrom. When the tray has been moved a sufficient distance along said conveyor, each of its slats is rotated in successive steps to deposit its proofed dough forms onto a lower conveyor, which, in turn, delivers them into a cooking vessel. After cooking the dough forms in oil in the usual manner, the doughnuts are removed by a conveyor for cooling and packing, which operations are not shown in the drawings.

An object of the present invention is to provide an automatic machine that will receive raw dough forms in spaced relation on a tray, move the filled tray through a proofer, deposit the proofed dough forms onto a conveyor for delivery to a cooking vessel, and then return the empty tray to the formers for reloading with freshly cut dough forms.

Another object of the invention is the provision of a machine that is capable of manipulating a plurality of self-dumping trays in a circuitous manner.

Another object of the invention is the provision of a machine that is capable of manipulating a plurality of self-dumping trays in an efficient, economical and sanitary manner through the proofing operation in the manufacture of yeast-raised doughnuts and like products.

A further object of the invention is to provide a simple, efficient and inexpensive machine capable of handling large quantities of raw yeast raised dough forms between the former and the cooking vessel.

Another object of the invention is the provision of a proofer adapted to support in the form of a series of stacks a plurality of rigid trays, whereby the trays ascend in one stack, are transferred at their topmost level to a second stack, descend while in the second stack and are removed therefrom, said stacks being within a dustproof air-conditioned chamber for proofing the raw dough forms carried by said trays.

A further object of the invention is to provide means for depositing said proofed raw dough forms from said trays onto a conveyor for delivery to the cooking vessel, and for returning said emptied trays to the dough former for reloading.

Other and further objects and advantages of the invention reside in the detailed construction of the several parts, which result in simplicity, economy and efficiency, and which will be apparent from the following description, wherein a preferred embodiment of the invention is shown, reference being had to the accompanying drawings, forming a part hereof, wherein like numerals indicate like parts, in which:

FIGURE 1 is a top plan view of a machine constructed in accordance with the principles of the invention;

FIGURE 2 is a side elevational view of the machine shown in FIGURE 1, with the cooking vessel being shown only fragmentary since its features form no part of the present invention;

FIGURE 3 is an enlarged fragmentary plan view of the dough formers, showing the conveyor which delivers the trays under the same to receive a new charge of raw dough forms;

FIGURE 4 is a side elevational view of the formers shown in FIGURE 3, the same having been taken substantially along the line 4—4 thereof, looking in the direction of the arrows;

FIGURE 5 is an enlarged side elevational view of the proofing chamber, with parts being broken away to show portions of its operating mechanisms;

FIGURE 7 is a plan view showing the conveyor mechanisms for receiving the proofed dough forms from the proofer and delivering them into the cooking vessel containing the hot cooking oil (not shown);

FIGURE 8 is a side elevational view of the conveyor mechanism shown in FIGURE 7, and showing the means for rotating the slats of the proofing trays for discharging the proofed dough forms therefrom onto the conveyor for delivery into the cooking vessel;

FIGURE 10 is a side elevational view of the drive mechanism for the descending elevator, the same having been taken substantially along the line 10—10 of FIGURE 9;

FIGURE 11 is an end elevational view of the drive mechanism shown in FIGURE 10, the same having been taken substantially along the line 11—11 of FIGURE 10, looking in the direction of the arrows;

FIGURE 15 is a fragmentary end elevational view of the drive mechanism for the conveyors entering and leaving the proofing chamber, the same having been taken substantially along the line 15—15 of FIGURE 5, looking in the direction of the arrows;

FIGURE 16 is a front elevational view of the drive mechanism for the conveyors entering and leaving the proofing chamber, the same having been taken substantially along the line 15—15 of FIGURE 5, looking in the direction of the arrows;

FIGURE 19 is a front elevational view of the timing mechanism shown in FIGURE 17, the same having been taken substantially along the line 19—19 thereof, looking in the direction of the arrows;

FIGURE 20 is a top plan view of one of the especially designed trays for receiving, transporting and discharging the raw dough forms through the machine shown in FIGURES 1 to 19, both inclusive;

FIGURE 21 is a side elevational view of the tray shown in FIGURE 20;

FIGURE 22 is an enlarged fragmentary cross-sectional view of the tray shown in FIGURE 20, the same being taken substantially along the line 22—22 thereof, looking in the direction of the arrows, and showing the mounting for said slats and one of its slats being tilted into its dough discharging position;

FIGURE 23 is an enlarged fragmentary cross-sectional view of the tray shown in FIGURE 20, the same having been taken substantially along the line 23—23 thereof, looking in the direction of the arrows, which shows the construction of one of said slats in detail;

FIGURE 24 is a fragmentary view taken substantially along the line 24—24 of FIGURE 7, showing the mechanism for causing the individual slats of the tray or screen to rotate to discharge the proofed dough forms therefrom;

FIGURE 25 is a sectional view, taken substantially along the line 25—25 of FIGURE 1, looking in the direction of the arrows and showing the arrangement of the guide wheels on the return conveyor over which the empty trays or screens gravitate upon their return to the receiving end of the machine;

FIGURE 28 is a fragmentary isometric view showing the construction and operating drives for the ascending and descending elevators;

FIGURE 29 is a fragmentary end elevational view of the mechanism shown diagrammatically in FIGURE 28;

Figure 14:
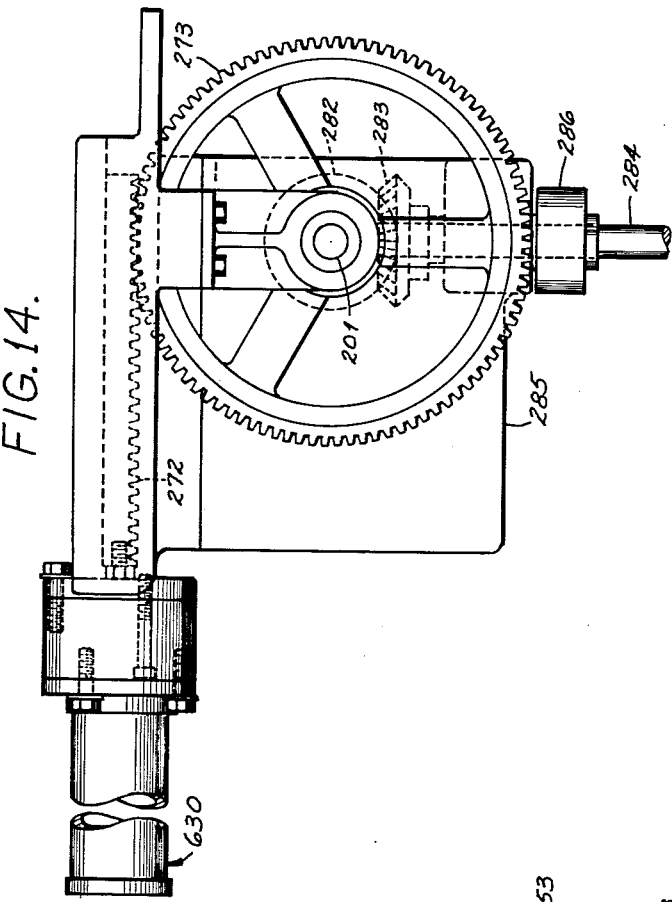
FIGURE 14 is a fragmentary end elevational view of the driving mechanism for the ascending elevator shown in FIGURE 12, the same having been taken substantially along the line 14—14, looking in the direction of the arrows.

FIGURE 30 is a longitudinal sectional view of the mechanism shown in FIGURE 29, the same having been taken substantially along the line 30—30 of FIGURE 29, looking in the direction of the arrows; and FIGURE 31 is a top plan view, on an enlarged scale, of the transfer conveyor shown in FIGURE 2, the same having been taken substantially along the line 31—31 thereof, looking in the direction of the arrows.

The Tray or Screen

It is believed a better understanding of the invention will be had if the construction of one of the trays or screens is given before entering into a detailed description of the machine.

The trays or screens 40 employed in the operation of the machine are adapted to hold a quantity of raw dough forms 45 in longitudinally spaced transversely extending rows. One of these trays or screens 40 is shown in detail in FIGURES 20 to 23, but the features thereof form the subject-matter of copending application Serial No. 695,-667, filed November 12, 1957, by Ernest J. Roth, entitled Tray or Screen for Proofing and Cooling Bakery Products, and now Patent No. 2,919,824, issued January 5, 1960.

Each tray or screen comprises a pair of spaced side rails 41 and 42 connected rigidly at their opposite ends by suitable end rails 43 and 44. Mounted within such frame structure in longitudinally spaced relation are a series of transversely extending shafts 46, the intermediate portion 47 of each shaft 46 is square in cross-section and has a hollow slat 48 mounted thereon.

The construction of one of the slats 48 is shown in detail in FIGURE 23. By making the slat 48 of a hollow construction, its weight is not only reduced materially, but there is provided a passageway for the square intermediate portion 47 of the shaft 46. Each slat 48 may be formed of aluminum, plastic or any other suitable material for supporting raw dough forms. Its opposite ends are folded or bent inwardly in spaced relation, as indicated at 49 and 51. Each slat 48 is covered with a removable fabric 52, the ends 53 and 54 of which are tucked wedgingly or folded between said spaced ends 49 and 51 of the slats 48.

The opposite ends of each shaft 46 are circular in cross-section, and suitably journalled in their respective side rails 41 and 42. A knurled roller 56 is mounted fixedly on each shaft 46 between the end of its slat 48 and the adjacent side rail 42 for frictionally and cammingly engaging a fixed trackway to be mounted in its path.

The other end of each shaft 46 is provided with suitable spring holding means in the form of opposed leaf-springs 58 and 59. These leaf springs are mounted fixedly on a supporting bar 61, the construction being such that only one supporting bar is required for each pair of slats. The springs 58 and 59 tend to restrict the rotation of the shaft 41, and cause it to maintain substantially a horizontal position when not under actuation of its knurled roller 56.

The Machine

Referring now to the drawings, and particularly to FIGURES 1 and 2 thereof, there is shown a rectangularly shaped main supporting frame structure 31, having a plurality of longitudinally extending supporting rails 32 and transversely extending cross-braces 33, said frame structure 31 being suitably supported on spaced legs 34, having conventional adjustable feet 36, which permits suitable adjustments for leveling.

In the operation of the machine, the trays or screens 40 are adapted to hold a quantity of raw dough forms 45 in longitudinally spaced transversely extending rows, and it is the purpose of the present invention to handle the loading, proofing, dumping and return of the empty trays 40 to the loading operation automatically and efficiently without requiring any manual labor.

The receiving or input end of the machine is shown in the right of FIGURES 1 and 2 of the drawings, and is provided with three longitudinally spaced and transversely extending driven knurled shafts or rollers 71, 72 and 73, which are suitably journalled in bearings 74 mounted on the main frame structure 31 in any convenient manner. Referring now to FIGURE 3, the roller 71 is provided with a fixed sprocket wheel 76, the roller 72 is provided with a pair of spaced fixed sprocket wheels 77 and 78, and the roller 73 also has a pair of spaced sprocket wheels 79 and 81. The sprocket wheels 76 and 77 are connected by a chain 82. The sprocket wheels 78 and 79 are connected by a second chain 83. The sprocket wheel 81 has a chain 84 connecting it with a sprocket wheel 86, which is, in turn, mounted fixedly on a shaft 87 journalled in bearings 88 secured to the side rails 32 of the frame structure 31. A guide rail 89 extends transversely above the spaced shafts 71, 72, 73 and 87, which serves as a stop or aligning means for the trays 40 being deposited on said shafts.

The shaft 87 intermediate its ends has a pulley wheel 91 around which extends one end of an endless conveyor speed belt 92. The opposite end of the conveyor speed belt 92 is mounted over a second pulley wheel 93, which is keyed to a shaft 94, journalled in suitable bearings 96 mounted on the frame structure 31. The speed belt 92 is provided with suitable horizontal supporting strips 97 extending longitudinally of the frame structure 31 and mounted in spaced relation on transversely extending supporting members 98 and 99. The supporting strips 97 prevent sagging of the speed belt 92 when trays 40 are carried thereon. The speed belt 92 is also provided with a series of longitudinally spaced rollers 101, 102, and 103 mounted on suitable supporting members attached to the main frame structure 31, which serve to maintain the bottom or return run of the speed belt 92 in a substantially horizontal position.

The drive for the speed belt 92 and rollers 71, 72 and 73, which operate in a continuous manner, is best shown in FIGURE 3. The motor 845 drives a sprocket wheel 107, keyed to its shaft, which engages a chain 108, which, in turn, engages a second sprocket wheel 109 keyed to a shaft 111 mounted in bearings 112 and 113. The shaft 111 has a second sprocket wheel 114 keyed thereto intermediate its ends, which drives a chain 116 whose opposite end is trained over a sprocket wheel 117 keyed to the shaft 94. From this construction, it will be apparent that the endless belt 92 and the receiving rollers 71, 72 and 73 are being driven continuously and in unison. Any empty trays or screens 40 deposited on the driven knurled rollers 71, 72 and 73 will be rolled forwardly immediately onto the speed belt 92, and thereby carried forwardly towards the formers 120. However, the trays or screens 40 can be fed continuously or intermittently under the dough formers 120 so that there is only one transverse row of raw dough forms 45 deposited on each slat 48 of each tray 40. This is accomplished by providing an intermittently operated horizontal indexing conveyor 121 consisting of a pair of transversely spaced indexing chains 122 and 123, one chain extending longitudinally on each side of the speed belt 92 and in spaced relation thereto. Each of the indexing chains 122 and 123 slides over an angle iron trackway 122a and 123a which serve to maintain them in substantially a horizontal position for engagement of said trays 40.

The indexing chains 122 and 123 are each provided with suitable longitudinally spaced indexing lugs 124, which are mounted on their respective chains directly opposite each other. These lugs 124 are in the form of an angular projection into the path of the tray 40 and prevent the forward movement thereof on the speed belt 92 except with the movement of the lugs 124. When the moving tray 40 engages the lugs 124, it is prevented from moving along with the speed belt 92 except by the step-by-step movement of the lugs 124 of the driving chains 122 and 123. The receiving ends of the driving chains 122 and 123 are enmeshed over spaced sprocket wheels 125 and 126 mounted fixedly on a shaft 127. The forward or opposite ends of the driving chains 122 and 123 are entrained over spaced sprocket wheels 125a and 126a mounted fixedly on the shaft 128. Thus, it will be apparent that the chains 122 and 123 with their fixed lugs 124 control the movement of the trays 40 in a step-by-step intermittent manner along the surface of the continuously moving speed belt 92. When the indexing chains 122 and 123 are at rest, during which period the raw dough forms 45 are deposited on a slat 48 of the tray 40, the speed belt 92 will slide under them without appreciable drag, wear or tear.

Figure 17:
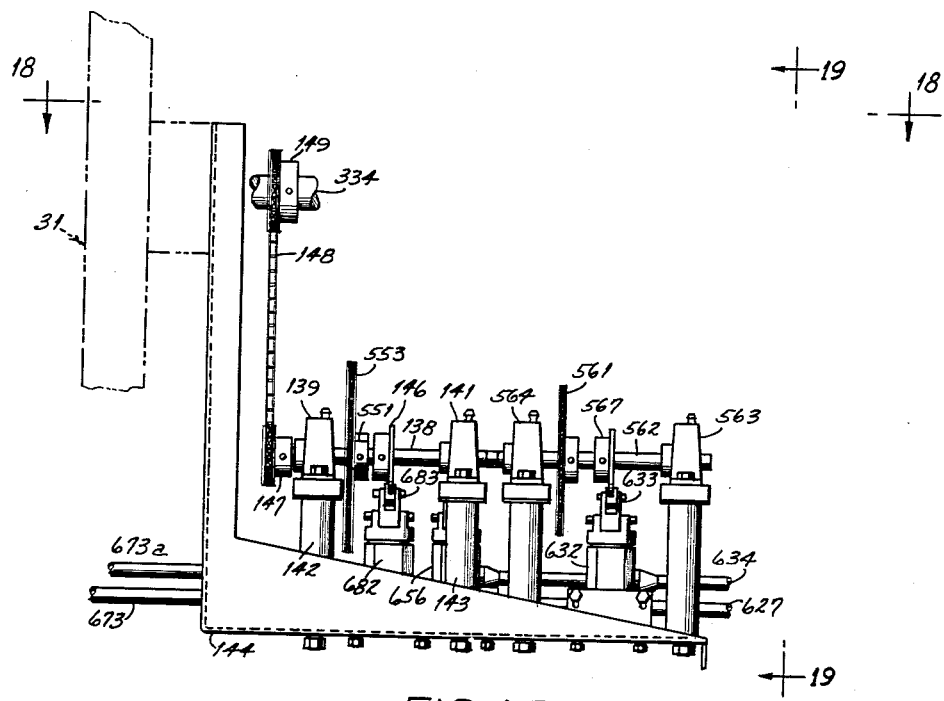
FIGURE 17 is an enlarged fragmentary side elevational view of the timing mechanism shown in FIGURE 8, the same having been taken substantially along the line 17—17 thereof, looking in the direction of the arrows.
Figure 26:
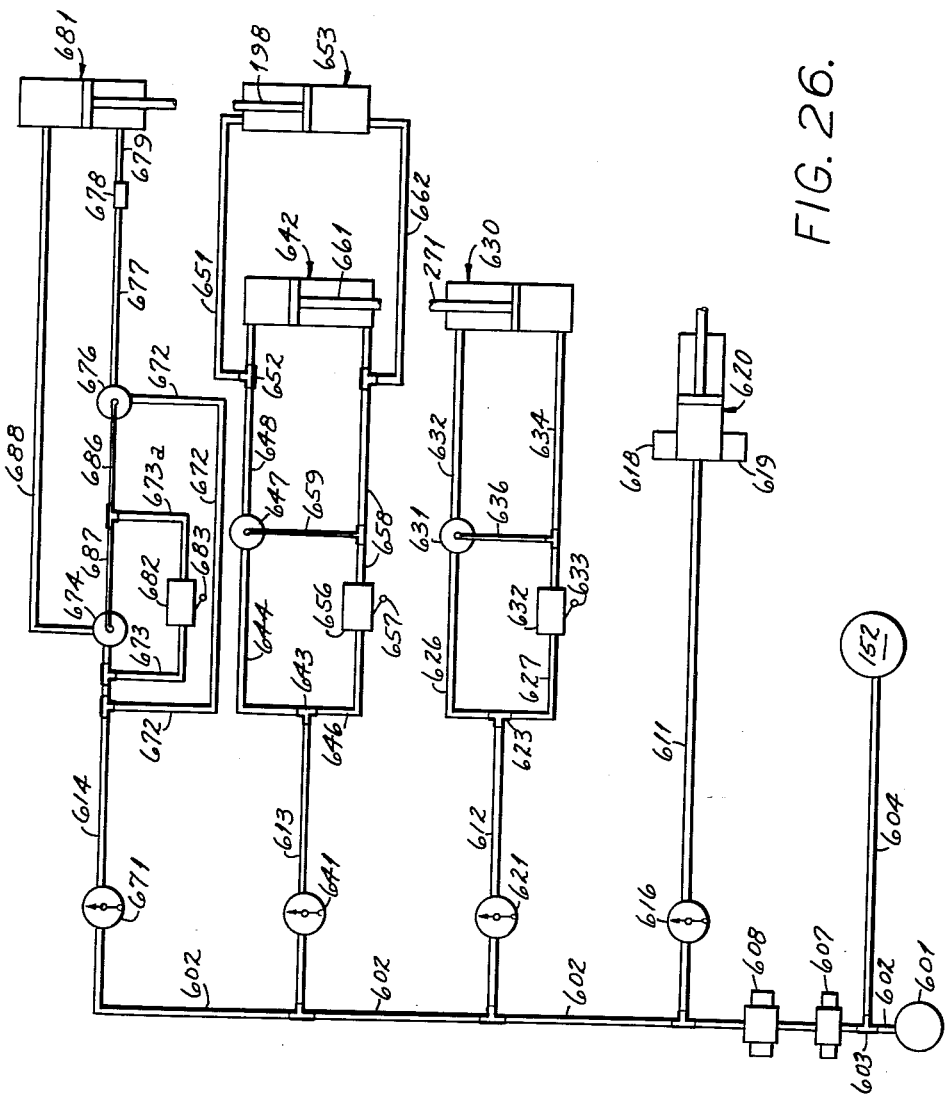
FIGURE 26 is a schematic drawing showing the pneumatic system used for actuating the mechanical parts of the machine.

The shaft 128 also has a sprocket 131 keyed thereto, which is driven by a chain 132, connected with a sprocket 133, which, in turn, is mounted fixedly to a conventional indexing rotary air motor 681 which is controlled by the valve 682. The valve 682 is actuated by its lever arm 683, as best shown in FIGURES 17 and 26. The lever arm 683 is operated by the cam 146 to control the air cylinder operating intermittently the indexing motor 681, which controls the movement of the indexing chains 122 and 123.

It will be noted in FIGURE 17 that a shaft 138 is journalled between spaced bearing members 139 and 141, which are suitably supported on spaced columns 142 and 143 mounted on a supporting bracket 144 secured to the main frame structure 31. The shaft 138 has mounted fixedly thereon a cam member 146 adapted for camming engagement with the lever arm 683 of the air valve 682. When the arm 683 is depressed by camming action, air in the pipe line 673 is now passed through said valve 682 and into the line 673a leading into the air lines 686 and 687, thereby causing the air motor 681 to revolve through an angle of ninety degrees. This movement of ninety degrees drives the indexing conveyor 121 the distance between centers of adjacent slats 48 of the tray 40. The shaft 138 secured its driving power from a sprocket 147 fixedly secured thereto, which, in turn, is driven by a chain 148. The opposite end of the chain 148 is enmeshed over a sprocket wheel 149 fixedly mounted on a shaft 334, which is best shown in FIGURES 7 and 8.

The Dough Formers

The details of construction of the dough formers 120 form no part of this invention, and their operation is conventional and substantially like that shown in United States Letters Patent No. 2,600,075, issued June 10, 1952, to Ernest J. Roth, entitled Automatic Doughnut Former. It is obvious that the number of individual dough formers operating in unison are dependent upon the number of raw dough forms 45 to be deposited on each slat 48 of each tray 40. In the illustration shown, there are four such formers 120 operating in a transverse row in unison from a single dough hopper 152, which is subdivided to provide four hoppers within a single tank.

Referring now to FIGURES 3 and 4, the formers 120 of conventional construction are operated by the switch 892, which is mounted within said motor 681, which is also the air motor operating the indexing conveyor 121. When the motor 681 reaches the end of its forward or work stroke, which is the end of its ninety degree turn, the limit switch 892 is actuated, which in turn, operates the air cylinder or motor 620. The piston of the air motor 620 is connected to a clutch arm 151 of a conventional cutter clutch assembly.

The Proofing Chamber

Referring again to FIGURES 1, 2 and 5, there is shown a proofing chamber 81, which is in the form of a large enclosed chamber mounted vertically on top of the main frame structure 31 in any suitable manner. The front and back sides of the chamber 81 are provided with suitable glass doors 82 mounted on hinges 83. Each door 82 has a handle 84 to facilitate opening and closing the same manually.

The chamber 81, the details of which are best shown in FIGURES 28 to 30, is equipped with an ascending elevator 240, which elevator is wide enough to receive on each horizontal flight three longitudinally arranged loaded trays or screens 40.

The trays or screens 40 are moved into the proofing chamber 81 by the movement of the indexing chains 122 and 123, operating through and under the dough formers 120 while being supported by the top surface of the speed belt 92. When the trays 40 leave the forward end of the chains 122 and 123, they are free to move again with the movement of the speed belt 92, which carries said trays 40 into a second indexing mechanism 160 (see FIGURE 2) that operates longitudinally of the proofing chamber 81.

Figure 9:
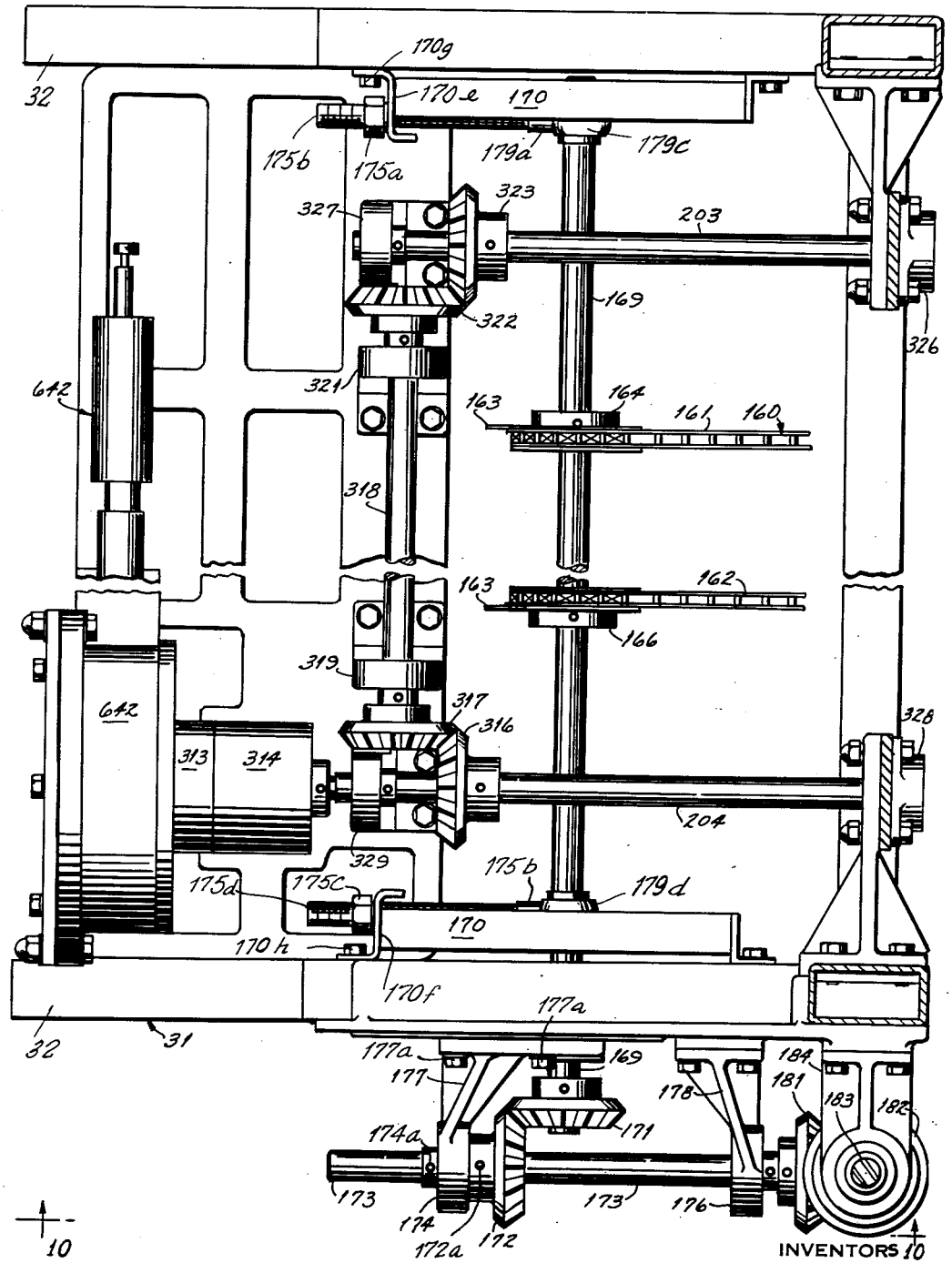
FIGURE 9 is a plan view of the drive mechanism for the descending elevator, the same having been taken substantially along the line 9—9 of FIGURE 5, looking in the direction of the arrows.

The second indexing mechanism 160 consists of a pair of spaced chains 161 and 162, which are provided with a series of oppositely spaced lugs 163, as best shown in FIGURES 2 and 9. The take-up ends of the chains 161 and 162 enmesh spaced sprocket wheels 164 and 166, which, in turn, are keyed to a shaft 169. The opposite or receiving ends of the chains 161 and 162 enmesh spaced sprocket wheels 167 and 168, respectively, on the shaft 128 as best shown in FIGURE 3. The shaft 169 is provided with conventional adjustable means 170 adjacent its opposite ends to provide a suitable take-up for any slack that may develop in the chains 161 and 162 of said indexing mechanism.

The shaft 169 extends outwardly of the main frame structure 31 (see FIGURE 9) on one side, and has a bevel gear 171 keyed to its free end, which engages a second bevel gear 172 keyed to a longitudinally extending shaft 173 journalled in suitable bearing members 174 and 176 secured to the main frame structure by the bearing brackets 177 and 178.

The shaft 173 has a second bevel gear 181 keyed thereto. Referring now to FIGURE 10, the second bevel gear 181 is, in turn, meshed with a third bevel gear 182, which is keyed to one end of a shaft 183 journalled in a bearing member 184.

The opposite end of the shaft 183, as best shown in FIGURES 15 and 16, is journalled in a bearing member 186, and has a bevel gear 187 keyed to its outer free end, which, in turn, engages a bevel gear 188 keyed to a shaft 189, journalled in a bearing 191. The shaft 189 extends through a spur gear 192 secured fixedly to a one way conventional clutch 194, which is keyed to the shaft 189. Referring now to FIG. 9, the bottom of the shaft 183 is journalled in the bearing member 184 and the top thereof is journalled in the bearing member 186. A bevel gear 182 is keyed to the bottom end of the shaft 183, which, in turn, enmeshes with the bevel gear 181 keyed to the shaft 173. One end of the shaft 173 is supported by the bearing 176 mounted in the bracket 178, and its free opposite end is journalled in the bearing 174 mounted in the bracket 177. It will be apparent that the bevel gear 172 is secured to the shaft 173 by a set-screw 172a. The bearing 174 has a set-screw 174a for securing it to the shaft 173. By loosening the set-screws 172a and 174a, together with the bolts 177a, the bracket 177 is ready to be moved within the limits of the slots 180 and 180a. (See FIG. 10.) However, before any movement of the bracket 177 can be made relatively to the bolts 177a in the slots 180 and 180a, it will be necessary to loosen the adjusting nut 175a on the adjustment bolt 175b and the adjusting nut 175c on the adjustment bolt 175d. (See FIG. 9.) It will be noted the opposite ends of the threaded adjustment bolts 175b and 175d are threadingly mounted in internally threaded collars 179a and 179b, respectively, which collars are secured to bearing members 179c and 179d on the shaft 169. When the bracket 177 has been moved from right to left as viewed in FIGS. 9 and 10 of the drawings a sufficient distance to take up the slack in the conveyor chains 161 and 162, the nuts 175a and 175c may be tightened on their respective bolts 175b and 175d against the stationary end brackets 170e and 170f, which are mounted fixedly on the rails 32 of the frame structure 31 by the bolts 170g and 170h.

A rack 197 enmeshes with the spur gear 192. The rack 197 is mounted fixedly on the end of a piston rod 198, which operates in an air cylinder 653. It will be apparent in this construction that the rack 197 will actuate the shaft 189 through the spur gear 192, adapter 193 and clutch 194 only in one direction, viz: on its upward stroke. On its return stroke the piston rod 198 and the clutch 194 will not actuate the shaft 189. This movement of the rack 197 controls the forward movement of the indexing chains 161 and 162, which comprise the second indexing mechanism 160, which, in turn, controls the feeding of the loaded trays 40 into the proofing chamber 81 and then onto the vertically spaced flights 221a and 221b of the ascending elevator 240 hereinafter to be described.

*The Ascending Elevator*

Referring now to FIGURES 28, 29 and 30, there is shown an ascending elevator 240, which embodies a construction using four line shafts arranged to provide a horizontally spaced pair of line shafts 201 and 202 adjacent the top of the proofing chamber 81, and a horizontally spaced pair of line shafts 203 and 204 adjacent the bottom of the proofing chamber 81. It will be apparent that the spaced top pair of line shafts 201 and 202 are in vertical alignment, respectively, with the spaced bottom pair of line shafts 203 and 204. These shafts are suitably supported by spaced bearing members 206 of conventional construction. See FIGURE 5.

The back top line shaft 201 has three spaced sprockets 207, 208 and 209 keyed thereto, and the bottom line shaft 203 mounted in alignment adjacent the back bottom of the proofing chamber 81 is likewise provided with three spaced idler sprocket wheels 211, 212 and 213, which are in vertical alignment with the sprocket wheels 207, 208 and 209, respectively, on the top line shaft 201. The sprocket wheels 207 and 211 are connected by a chain 216. The sprocket wheels 208 and 212 are connected by a second chain 217, and the sprocket wheels 209 and 213 are similarly connected by a third chain 218. Each of the chains 216, 217 and 218 are connected at vertically spaced intervals with an angle iron member 221a, which angle iron members 221a have their free sides extending horizontally inwardly to provide a continuous series of flight supporting members or shelves extending longitudinally of the proofing chamber 81 in a horizontal plane for supporting one side of a tray 40.

The front top shaft 202 has three similarly spaced sprocket wheels 223, 224 and 226 keyed fixedly thereto. The front bottom shaft 204 has three correspondingly spaced idler sprocket wheels 227, 228 and 229 mounted thereon. The sprocket wheels 223 and 227, which are aligned vertically, are connected by a chain 231. The vertically aligned sprocket wheels 224 and 228 are also connected by a second chain 232, and the vertically aligned sprocket wheels 226 and 229 are similarly connected by a third chain 233. Each of the chains 231, 232 and 233 are connected at vertically spaced intervals with an angle iron member 221b, which have their free sides extending horizontally inwardly towards the members 221a and in the same horizontal planes.

With this construction, it will be obvious that the flights 221a and 221b of the foregoing arrangement will provide an ascending elevator 240, having a continuous set of vertically spaced flights operating in unison along the front and back, respectively, of the proofing chamber 81, which flights are adapted to support the opposite sides 41 and 42 of a loaded tray or screen 40 carried thereinto and deposited therebetween, as best shown in FIGURE 29.

Figure 12:
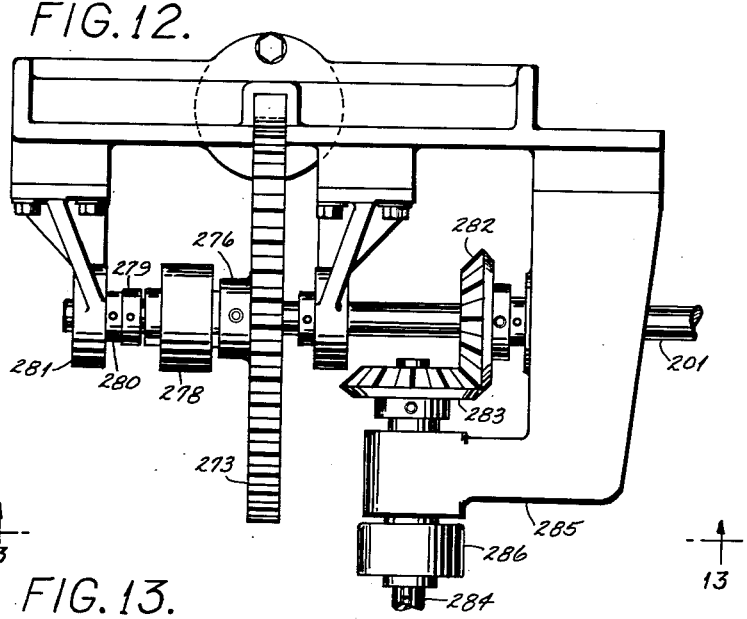
FIGURE 12 is a fragmentary top plan view of the driving mechanism for the ascending elevator of the proofing chamber.
Figure 13:
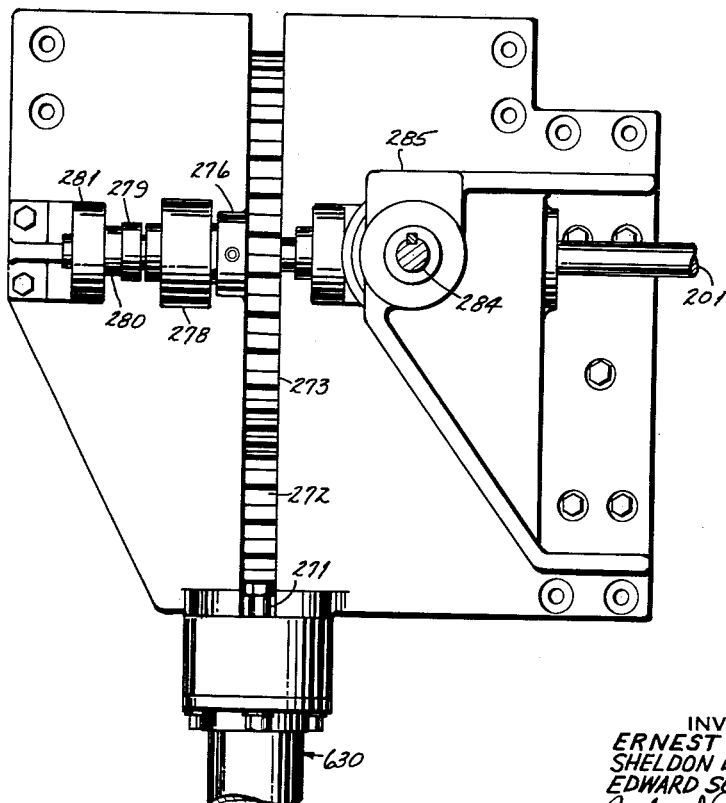
FIGURE 13 is a front elevational view of the driving mechanism shown in FIGURE 12, the same having been taken substantially along the line 13—13, looking in the direction of the arrows.

Referring now to FIGURES 12, 13 and 14, and also FIGURE 28, there is shown an air motor 630 which operates the ascending elevator 240. Its piston arm 271 is provided with a gear rack 272 that engages a gear 273, which is not connected directly to its supporting shaft 201. The gear 273 has an axial hub 276, which connected with a conventional one way slip clutch 278, which, in turn, is keyed directly to the shaft 201. This mounting arrangement moves the shaft 201 in only one direction, and the downward stroke of the spur rack 272 turns the shaft 201 a distance sufficient to move one flight distance on the ascending elevator 240.

The shaft 201 has a spacer collar 279 between it and its end supporting bearing 280 mounted in a suitable bearing bracket 281. A bevel gear 282 is mounted in spaced relation to the spur gear 273 on the shaft 201, which gear 282 is suitably keyed thereto. The bevel gear 282 meshes with a second bevel gear 283, keyed to a horizontally extending shaft 284 supported by a bearing member 285. The shaft 284 is provided with a conventional braking mechanism 286 that serves to hold the ascending elevator 240 in a fixed position when not actually under the controlled movement of its spur gear 273.

The shaft 284 has a second bevel gear 289 keyed to its forwardly extending end, as best shown in FIGURE 28, which, in turn, meshes with a bevel gear 290 mounted fixedly on one end of the shaft 202. Thus, it will be obvious that the shaft 202 is driven in unison with the shaft 201. Since the sprocket wheels 207, 208 and 209 are keyed to the shaft 201, and since the sprocket wheels 233, 224 and 226 are keyed to the shaft 202, it will be apparent that these sprocket wheels will be turned with their respective shafts, thereby providing driving power for the ascending elevator 240 through the chains 251 and 252.

*The Descending Elevator*

The descending elevator 241 is so constructed that its sprocket wheels are mounted on the same shafts 201, 202, 203 and 204 as those upon which the ascending elevator 240 has been mounted.

The front bottom line shaft 204 has mounted thereon in spaced relation two sprocket wheels 246 and 247, which are keyed to the shaft 204. Mounted on the top front line shaft 202 are two similarly spaced sprocket wheels 248 and 249, which are in vertical alignment with the sprocket wheels 246 and 247 on the front bottom line shaft 204. The sprocket wheels 248 and 249 are idler sprocket wheels and therefore are not connected fixedly to the shaft 204, but are free to rotate independently thereof. The bottom sprocket wheel 246 and the top front sprocket wheel 248 are connected by a suitable chain 251, and the bottom front sprocket wheel 247 and the top front sprocket wheel 249 are similarly connected by a chain 252.

The bottom back line shaft 203 has two sprocket wheels 253 and 254 spaced thereon, which are keyed to rotate with said shaft 203. The top back line shaft 201 likewise has two spaced sprocket wheels 256 and 257 mounted thereon, which are also idler wheels and free to rotate independently of said shaft 201. The sprocket wheels 253 and 256 are connected by a chain 258, and the sprocket wheels 254 and 257 are likewise connected by a chain 259.

The front chains 251 and 252 are connected by a series of spaced angle iron flights 261a extending longitudinally of the machine, and the back chains 258 and 259 are likewise connected by a similar series of spaced angle iron flights 261b. The flights 261a and 261b are arranged in the same horizontal planes and provide a continuous descending elevator 241, extending longitudinally of the proofing chamber 81 (front and back) for supporting a series of loaded proofing trays or screens 40 therebetween.

*The Top Transfer Conveyor*

It will be manifest that some means must be provided for shifting the semiproofed trays 40 from the top level of the ascending elevator 240 to the top level of the descending elevator 241, while both elevators are at rest. However, it will be apparent that the flights 261a and 261b of the descending elevator 241 are much shorter than the flights 221a and 221b of the ascending elevator 240. In fact, they are only one-third the size, and, therefore, are capable of holding only one loaded tray 40 instead of a line of three loaded trays. Therefore, the descending elevator 241 must operate exactly three times as fast as the ascending elevator 240.

Figure 6:
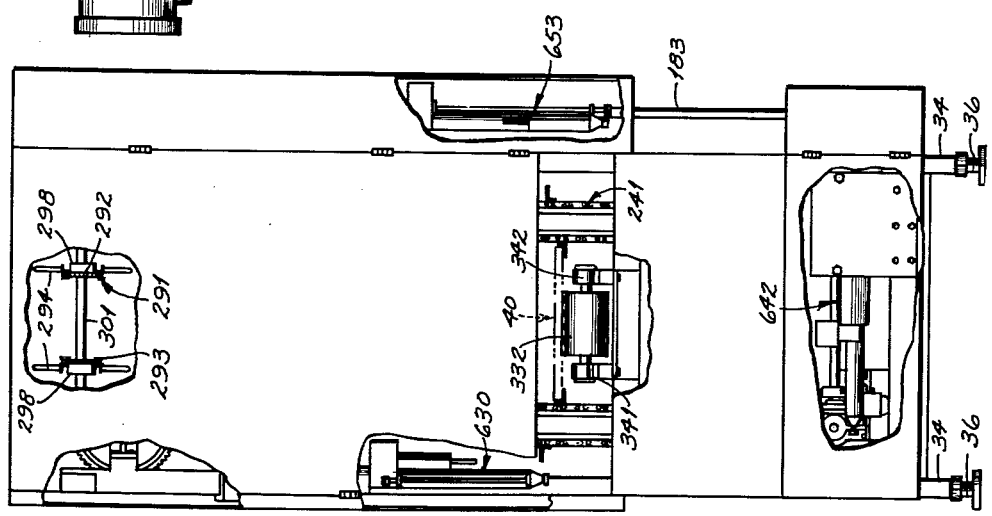
FIGURE 6 is an elevational view of the proofing chamber, showing its discharge end, the same having been taken substantially along the line 6—6 of FIGURE 5, looking in the direction of the arrows.

Referring now to FIGURES 2, 6 and 16, there is shown the top transfer conveyor 291, which consists of a pair of transversely spaced chains 292 and 293. Each of the chains 292 and 293 is provided with a series of spaced outwardly extending lugs 294 arranged oppositely each other. The chains 292 and 293 are trained over pairs of spaced sprocket wheels 297 and 298, which, in turn, are mounted fixedly on spaced shafts 299 and 301 journalled in suitable bearing members mounted at opposite ends of the top of said proofing chamber 81 on the main frame structure 31.

This top transfer conveyor 291 is so positioned immediately above the top of the ascending elevator 240 and the horizontally aligned top of the descending elevator 241 that its depending lugs 294 will engage the rear end 44 of the trays 40 positioned thereon and carry them forwardly therewith, whereby a loaded tray 40 is carried off the top level of the ascending elevator 240 and delivered to the top level of the descending elevator 241.

It will be obvious that this top transfer conveyor 291 must be driven in timed sequence with the bottom indexing conveyor 160, and that both conveyors must be operated only during the intervals that the elevators are at rest. The transfer conveyor 291 is driven through the shaft 189 and the bevel gears 302 and 303, as best shown in FIGURE 16. The bevel gear 303 is keyed to the shaft 189. Thus, it will be apparent that the bottom indexing conveyor 160 and the top transfer conveyor 291 operate in unison, one loading a tray 40 onto the bottom flights of the ascending elevator 240 while the other is unloading a tray 40 from its top flight and thereupon shifting or delivering it forwardly onto the top flight of the descending elevator 241.

Referring now to FIGURE 9, the forward end of the descending elevator 241 is actuated directly by a conventional rotary air motor 642, which is operatively connected to the rear end of horizontally extending shaft 204 through a coupling 313 and a conventional one-way clutch 314 keyed thereto. The clutch 314 helps to control the downward motion of the loaded descending elevator 241. The rear end of the descending elevator 241 is simultaneously actuated therewith through the bevel gear 316 keyed to the shaft 204, which, in turn, meshes with a bevel gear 317 keyed to a shaft 318 journalled in spaced bearings 319 and 321. The opposite end of the shaft 318 has a bevel gear 322 keyed thereto, which meshes with a bevel gear 323 keyed to the rear end of the horizontally extending drive shaft 203 journalled in spaced bearings 326 and 327 and the drive shaft 204 is likewise journalled in spaced bearings 328 and 329 secured to the main frame structure 31.

When the trays 40 carrying proofed dough forms 45a reach the bottom of the descending elevator 241, they are deposited on a continuously driven belt 330, running thereunder, and are thereby carried out of the proofing chamber 81. See FIGURES 7 and 8. The belt 330 is mounted between longitudinally spaced pulley wheels 332 and 333 keyed to shafts 334 and 336, respectively. The shaft 334 is journalled in spaced bearings 338 and 339 mounted on the supporting frame structure 31. The shaft 336 is likewise journalled in spaced bearings 341 and 342 secured to the main supporting frame structure 31. The shaft 334 has a sprocket wheel 343 keyed thereto, which engages an endless chain 344, whose opposite end engages a sprocket wheel 346 keyed to a shaft 347. The spaced chains 356 and 357 operate over spaced angle iron trackways 348 and 349, which also serve to support and guide the sides 41 and 42 of the tray 40. See FIGURE 24.

The trays 40, while moving forwardly on the belt 330, engage lugs 354 mounted oppositely on spaced guide chains 356 and 357, forming a conveyor 359. The rear ends of the guide chains 356 and 357, extend around sprocket wheels 361 and 362, respectively, which are keyed to the shaft 347. The forward ends of the guide chains 356 and 357 extend around sprocket wheels 363 and 364 keyed to a shaft 366 journalled in spaced bearing members 367 and 368 secured to the frame structure 31. The lugs 354 are spaced on the chains 356 and 357 a distance slightly longer than the length of the tray 40. The lower run of the guide chains 356 and 357 extend over a series of spaced sprocket wheels 371, 372, 373 suitably keyed to shafts 376, 377 and 378, respectively, journalled in bearing members mounted on spaced supporting brackets 379.

The lugs 354 on the guide chains 356 and 357 serve to move a loaded tray 40 with its proofed dough forms 45a over a second belt 381, which is best shown in FIGURES 7 and 8. During movement of the trays 40 on the belt 330 the pairs of spaced lugs 354 engage the rear edge 44 of each tray 40 and carry it past the discharging station 391. The knurled rollers 56 of the slats 48 are thereby pushed under and into frictional camming engagement with a cam track 392 fixedly mounted in a depending actuating position by a supporting bracket 393 extending transversely of the machine, as best shown in FIGURE 7. When the knurled roller 56 engages the cam track 392, it will, due to its frictional contact, rotate, thereby turning or flipping its slat 48 in an arc of 180 degrees and gravitationally discharging the proofed dough forms 45a therefrom onto the canvas belt 381. The length of the cam track 392 determines the degree of rotation of the knurled roller 56, and hence the arc of the turn on its slat 48.

When the proofed dough forms 45a are discharged from their slats 48, they gravitate onto the top side of the canvas belt conveyor 381, which operates over a series of suitably spaced rollers 402, 403, 404, 405, 406, 407, 408 and 409. The roller 406, which is keyed to a shaft 411, provides the necessary drive for said belt 381, and the shaft 411 also has a sprocket wheel 413 keyed thereto, a driving chain 414, which, in turn, is driven by a sprocket wheel 416 keyed to the shaft 417, thereby providing the necessary driving mechanism for the canvas belt 381.

The emptied trays 40 remain in their horizontal position of alignment on the tracks 348 and 349, and continue to be moved forwardly of the machine by the lugs 354 of the guide chains 356 and 357.

The supporting platform 418, as best shown in FIGURES 1 and 2, has a transversely extending shaft 422 mounted in suitable spaced bearing members 423 above the back edge thereof, and a second transversely extending shaft 424 (see FIGURE 31) is mounted in similar spaced bearing members 426 spaced above the forward edge thereof. The shaft 422 has a pair of spaced sprocket wheels 427 and 428 keyed thereto, and the shaft 424 is likewise provided with a pair of similarly spaced sprocket wheels 429 and 431 keyed thereto. A chain 432 is trained over the aligned sprocket wheels 427 and 429, and a second chain 433 is trained over the aligned sprocket wheels 428 and 431. Each chain 432 and 433 has an outwardly extending lug 434 spaced oppositely. The chains 432 and 433 form a conveyor 435, and are mounted in spaced relation above the supporting platform 418 sufficiently so that their lugs 434, when passing over their lower runs, will engage the side edge 44 of a tray 40 deposited thereon and move said empty tray 40 the length of said platform 418 and push the same onto a trackway 441 consisting of a series of three spaced bars 442, 443 and 444, which are in substantial horizontal alignment with the supporting surface of the platform 418.

Mounted above the trackway 441 formed by the bars 442, 443 and 444 is another transfer conveyor 451, which is constructed like the conveyor 435 operating above the supporting platform 418. This conveyor 451 consists of spaced shafts 452 and 453 mounted in suitable bearing members 454 secured to the main frame structure. The shaft 452 has a pair of spaced sprocket wheels 456 and 457 keyed thereto, and the shaft 453 has a similarly spaced pair of sprocket wheels 458 and 459 keyed thereto. A chain 461 is trained over the longitudinally aligned sprocket wheels 456 and 458, and a second chain 462 is trained over the longitudinally aligned sprocket wheels 457 and 459. Each chain 461 and 462 has a lug 463 extending outwardly therefrom and spaced opposite one another, which lugs 463 serve to engage the front edge 43 of the tray 40 resting on said trackway 441 to move it forwardly onto a conventional gravity wheel conveyor 470.

It will be noted in FIGURE 31 that the shaft 453 has a bevel gear 471 keyed to it, which meshes with a second bevel gear 472 keyed to the adjacent end of the shaft 424, thereby providing motive power for the conveyor 451 in unison with the conveyor operating over the platform 418.

The gravity wheel conveyor 470, which extends longitudinally along one side of the machine, and behind the proofing chamber 81, is shown best in detail in FIGURE 25. It will be noted in FIGURE 25 that each spaced supporting rail 471 and 472 of this conveyor 470 is provided with a series of longitudinally spaced vertically extending wheels 473 mounted by bolts 474, and has a second series of longitudinally spaced inwardly and horizontally extending wheels 746 mounted by bolts 477. These series of spaced wheels 473 and 476 provide a gravity channel for guiding the emptied trays 40 therealong for returning them to the forward end of the machine.

At the lower end of the wheeled trackway 470, there is shown a receiving platform 501 upon which the trays 40 gravitate when leaving the discharge end of said wheeled gravity conveyor 470. Mounted above said platform 501 is a chain conveyor 502, which is similar in construction to the conveyors 435 and 451. This conveyor 502 has three longitudinally spaced and transversely extending shafts 506, 507 and 508 mounted above the receiving platform 501 and journalled in suitable bearing members 509. Each shaft is provided with a pair of similarly spaced sprocket wheels 511, 512 and 513, and a pair of chains 516 and 517 are entrained over each set of aligned sprocket wheels. It will be noted that the forward shaft 508 is longer than the shafts 506 and 507, and has a bevel gear 514 keyed to its inner end, as best shown in FIGURE 3. The beveled gear 514 is meshed with a bevel gear 518 keyed to a shaft 519 mounted in suitable bearing members 520. The shaft 519 has a sprocket wheel 521 keyed thereto intermediate its ends, having a chain 522 operating thereover. The opposite end of the chain 522 is trained over a sprocket wheel 523 keyed to the shaft 127. Thus, it will be apparent that the conveyor 502 is driven from the same shaft 127 that operates the indexing conveyor 121 advancing the trays 40 into the former 120. Each of the chains 516 and 517 has a single extension lug 524 oppositely positioned for engaging the side edge of a tray 40 gravitationally discharged onto its receiving platform 501, which lugs 524 serve to move the tray 40 longitudinally of said platform 501 and deliver it onto the power driven rollers 71, 72 and 73, whereupon the empty tray 40 is ready to re-enter a new cycle of operation.

Referring now to FIGURES 2 and 8, it will be apparent that the proofed raw dough forms 45a are deposited onto the canvas belt 381 and carried thereby into a chute 531 through which they will be gravitated into a cooking vessel 532. The cooking vessel 532 has a series of conveyor flights 533 operating therein as best shown in FIGURE 1. The flights 533 serve to control the movement of the cooking dough forms 45b through the cooking oil in a manner well understood in the industry. Obviously, the discharge of proofed dough forms 45a into said cooking vessel 532 from the present machine must be synchronized with the movement of such forms 45b within said cooking vessel 532. This is accomplished by providing a driving means for the several conveyors handling the proofed raw dough forms 45b from the flight driving mechanism of the cooking vessel (not shown). A chain 541, operating from the drive for the flights 533 of the cooking vessel 532, is entrained over a sprocket wheel 542 keyed to the shaft 417.

Referring now to FIGURES 17, 18, 19 and 26, there is shown the mechanical drive for the timing mechanisms of the machine, which, as best shown in FIGURE 17, secures its motive power originally from the shaft 334 and chain 148.

Figure 18:
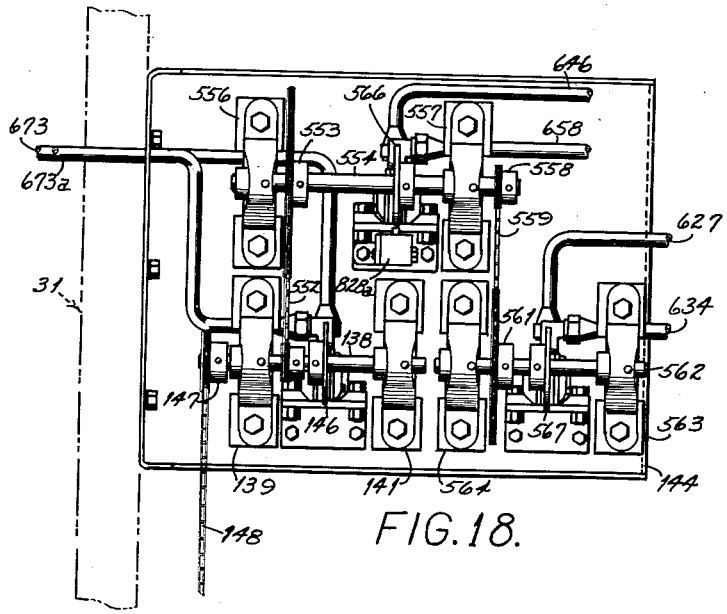
FIGURE 18 is a plan view of the timing mechanism shown in FIGURE 17, the same having been taken substantially along the line 18—18 thereof, looking in the direction of the arrows.

The opposite end of the chain 148 as best shown in FIGURES 17 and 18, is entrained over a sprocket wheel 147 keyed to one end of the shaft 138. The shaft 138 has a sprocket wheel 551 keyed thereto, which drives a chain 552 entrained over a larger sprocket wheel 553, which is, in turn, keyed to a shaft 554. The shaft 554 is journalled in suitable bearing members 556 and 557, and has a second sprocket wheel 558 keyed to its outer end, which, in turn, drives a chain 559. The opposite end of the chain 559 engages a larger sprocket wheel 561 keyed to a shaft 562 journalled in suitable bearing members 563 and 564.

The shaft 138 has a cam 146 that actuates a valve arm 683 of the valve 682, which controls the indexing conveyor 121 and indexing motor 681 for operating the battery of formers 120.

The shaft 554 has a cam 566 that actuates an arm 657 of the pilot valve 656 which controls the operation of the air motors 642 and 653, that, in turn, operate the bottom indexing conveyor 160 and the top transfer conveyor 291 of the proofing chamber 81 and also the descending elevator 241.

The shaft 562 has a cam 567 that actuates the valve arm 633 of the pilot valve 632, which controls the ascending elevator 240.

It will be apparent that the shaft 554 must be driven exactly one-sixth of the speed of the shaft 138 since the shaft 554 moves the tray 40 the distance between centers of adjacent slats 48 while the shaft 138 is required to move the entire tray 40 one tray length or the distance of the six spaced slats. The shaft 562 must be moved one-eighteenth of the speed of the shaft 138 since it operates the ascending elevator 240, which carries three trays 40 on each flight instead of a single tray as in the case of the descending elevator 241.

*Schematic Diagram of Air Motive Power*

Referring now to FIGURE 26, there is shown a compressor 601, which provides the air motive power for operating all of the mechanisms utilizing air power for their operation. The main air line 602, which is connected by a T-coupling 603 to an air line 604, leading to the pressure dough hopper 152 of the formers 120, controls the feeding of raw dough into the cutters 154. This main air line 602 has a conventional low pressure air switch 607 that serves to maintain a proper minimum amount of air pressure in the system when it is in operation. The system requires a minimum pressure of approximately 125 pounds per square inch. There is also mounted in the main line 602 a conventional solenoid air dumping valve 608 which serves to release or clear all of the air in the system when the machine is shut down at the end of an operating period. This valve 608 serves also to prevent any mechanism from moving out of synchronization due to air pressure remaining entrapped in the system when it is shut down. In other words, the valve 608 insures an instantaneous stopping of the moving parts upon a shut down.

The main air pressure line 602 has four secondary air lines 611, 612, 613 and 614 connected thereto, which provide the necessary air power to the different parts of the system.

The secondary air line 611, having a suitable air pressure gauge and valve combination 616 mounted therein, provides the air motive power for the dough formers 120. The air motor 620 operating the dough formers 120 is provided with a pair of spaced electrically operated conventional solenoid valves 618 and 619, which serve to control the operation of the same in a proper timed sequence.

The secondary air line 612, having a gauge and valve combination 621 mounted therein, provides air for operating the ascending elevator 240. The air line 612 is subdivided, as indicated at 623, into two air lines 626 and 627. The air line 626 carries the air power to a normally open conventional master valve 631 of an air poppet control type. The air in the pipe line 626 passes through the air valve 631 and through the air line 632 to the left side of the air motor 630, which operates the return or work stroke of the ascending elevator 240. The air line 627 at the same time carries air pressure to a normally closed conventional pilot valve 632, which has an arm 633 that is cam operated to open the same when desired. When the pilot valve 632 is opened by its camming mechanism engaging its operating arm 633, air is passed into the air line 634 and into the air line 636. The air entering the air line 636 actuates to close the normally open poppet control valve 631. This action permits the air passing through the air line 634 to actuate to the air motor 630 from right to left or on its forward stroke, thereby causing the ascending elevator 240 to move upwardly one flight.

The secondary air line 613, having an air gauge and valve combination 641 mounted therein, provides the air motive power for operating the bottom indexing conveyor 160, which serves to deliver the trays 40 loaded with raw dough forms 45 onto the successive flights 221a and 221b of the ascending elevator 240; the top transfer conveyor 291, which serves to remove the trays 40 of semi-proofed dough forms 45 from the topmost flight of the ascending elevator 240 and deliver it to the topmost flight of the descending elevator 241; and also to provide the necessary motive power for operating the descending elevator 241. This air line 613 is divided, as indicated at 643, into two parallel air lines 644 and 646. The air line 644 has a normally open conventional air valve 647 and through its connecting air line 648 to the left side of the air motor 642 of the descending elevator 241; which side controls the work stroke or the stroke which causes lowering of the trays 40 on the descending elevator 241.

The air line 648 has an air line 651 connected therewith, as indicated by the T 652, that serves to deliver air pressure to the air motor 653 to operate its return stroke, which does not move the bottom indexing conveyor 160 or the top transfer conveyor 291, but serves to reset the piston 198 for its next forward or work stroke.

The air line 646 at the same time carries its air pressure to a normally closed conventional pilot valve 656, which is provided with a cam operating lever 657 for opening the same when desired. When the valve 656 is opened, its air pressure passes therethrough into the air lines 658 and 659. The air passing through the air line 658 is carried to the opposite side of the air motor 642, causing its piston 661 to be moved upwardly, which is the return stroke of the same. At the same time, air is passed from the air line 658 into a line 662, which delivers its air to the air motor 653, forcing its piston 198 upwardly, operating its work or forward stroke, thereby operating the bottom indexing conveyor 160 delivering the trays 40 loaded with raw dough forms 45 to the ascending elevator 240 and the top transfer conveyor 291, which shifts the trays 40 from the ascending elevator 240 to the descending elevator 241 at the same time.

The secondary air line 614, having an air gauge and valve combination 671 mounted therein, provides air for operating the indexing conveyor 121 moving the empty trays 40 under the dough formers 120. The air in the line 614 after passing through the gauge 671, enters into a line 672 and a line 673, while at the same time is bypassed to a normally closed conventional master valve 674.

With the master valve 674 normally closed, air entering the pipe line 614 is by-passed into the air lines 672 and 673. The air in the pipe 672 passes through a normally open conventional poppet operated master valve 676 into the air line 677 into a one-way speed control valve 678, and into air line 679 leading to an air motor 681, thereby actuating the return stroke of its piston. Air entering the air line 673, passes into an air valve 682, which is normally closed but is opened by actuation of its arm 683, thereby allowing air to pass into the air line 673a. Air pressure in the line 673a passes into each of the air lines 686 and 687. Air passing into the air line 686 closes the normally opened valve 676, and simultaneously opens the normally closed valve 674, thereby allowing the air pressure to enter the air line 688, whereupon it passes into the opposite side of the piston of the air motor 681, actuating the forward or work stroke of the same.

The master poppet air valves 631, 647, 674 and 676 are identical except that the valve 674 is normally closed whereas the valves 631, 647 and 676 are normally open. The pilot valves 632, 656 and 682 are conventional three way valves in that each has an intake, delivery and exhaust port. The one way speed control valve 678 permits the passage of air therethrough in one direction only, and air in the line 679 behind the air motor 681 on the work stroke will be restricted through a small exhaust port in said valve, thereby regulating its back pressure to insure proper control of its movement.

*The Schematic Wiring Diagram*

Figure 27:
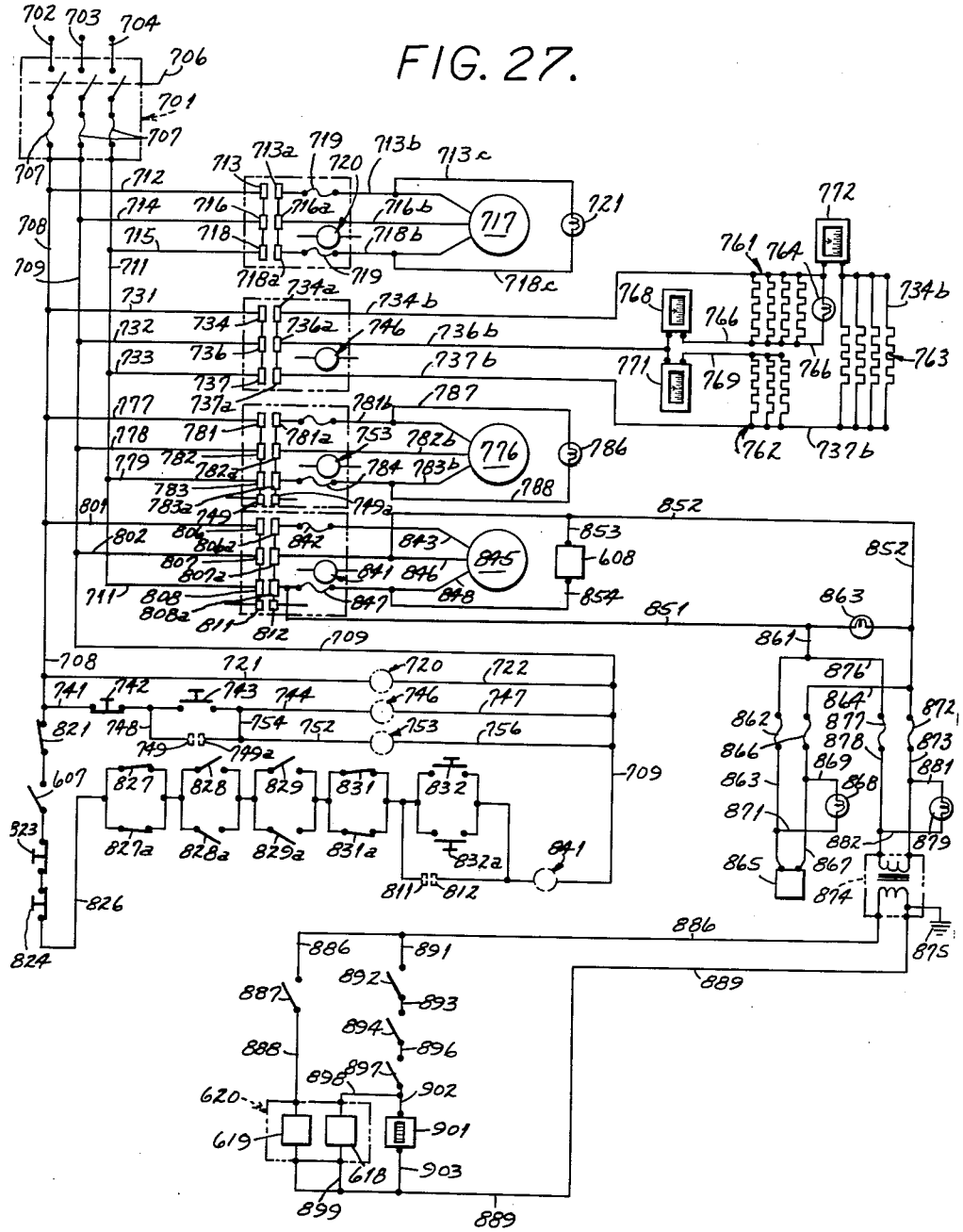
FIGURE 27 is a schematic drawing showing the electric wiring system of the machine.

Referring now to FIGURE 27, there is shown schematically the wiring diagram for the various electrical controls embodied in the machine. The schematic drawing is in accordance with the electrical format approved by the Joint Industrial Congress (J.I.C.) Electrical Standards for Industrial Equipment, as adopted and revised March 20–22, 1957.

The main switch box 701 receives its current from an outside source of supply (not shown) through the incoming wires 702, 703 and 704. The current passes through the manually operable switch 706, fuses 707 and into the lines 708, 709 and 711.

*Wiring for Compressor for Air System*

The line 708 has a line 712 leading to a contacter 713, the line 709 has a line 714 leading to a contacter 716, and the line 711 has a line 715 leading to a contacter 718. The contacters 713, 716 and 718 form one side of a circuit controlling a compressor motor 717 of a compressor 601. This circuit is provided with a holding coil 720, which is shown connected to the line 708 by a wire 721 and the line 709 by a wire 722. When the switch 706 is closed, the holding coil 720 is energized, causing its contacters 713a, 716a and 718a to contact magnetically their corresponding opposite contacters 713, 716 and 718, thereby energizing the motor 717 of the compressor 601 through their corresponding wires 713b, 716b and 718b. It will be noted that the wires 713b and 718b are provided with conventional fuses 719. The line 713b has a line 713c leading to one side of a conventional pilot light 721, and the line 718b has a line 718c leading to the opposite side of the pilot light 721, which becomes lighted when current is being supplied to the compressor motor 717 and goes out when one of its fuses 719 is blown or the main switch 706 is opened.

*Wiring for Air Conditioning System*

The lines 708, 709 and 711 have a second circuit connected thereto by the wires 731, 732 and 733, respectively, which, in turn, are connected to contacters 734, 736 and 737, which are used in connection with the energization of the air conditioning units used to control the temperature of the proofing chamber 81.

The line 708 has a wire 741 leading to a push-button stop switch 742, which, in turn, is connected in series with a push button start switch 743, having a wire 744 leading to one side of a holding coil 746, the other side of the holding coil 746 being connected by a wire 747 to the main line 709.

Between the stop switch 742 and the start switch 743, a line 748 connects with a contactor 749. A corresponding contactor 749a is connected by a wire 752 to one side of a holding coil 753. Intermediate the contactor 749a and holding coil 753, a line 754 connects the wire 752 with the wire 744. The opposite side of the holding coil 753 is, in turn, connected by a wire 756 to the main line wire 709. Thus, it will be apparent that the holding coils 746 and 753 are connected in parallel with the main line wires 708 and 709, and their energization is controlled by means of the stop and start switches 742 and 743, respectively.

The spaced contacters 734a, 736a and 737a are, in turn, connected in parallel by the wires 734b, 736b and 737b to a series of spaced electric heaters 761, 762 and 763. The heater 761 has a pilot light 764 connected therewith between the wires 734b and the wire 766. The wire 766, in turn, connects with one side of a thermostatic control means 768, having its opposite side connected by the wire 736b leading back to the contacter 736a.

The heater 762 has one side connected by a wire 769 to a thermostatic control means 771, having its opposite side connected by the wire 736b to its contacter 736a.

The heater 763 is connected between the wires 734b and 737b, and is provided with a thermostatic control 772 connected in series in the line 734b.

The heaters 761, 762 and 763, comprising the heating elements for the proofing chamber 81, are connected in parallel with a blower motor 776 so that heaters 761, 762 and 763 and blower motor 776 must operate at the same times. This arrangement maintains the heating elements 761, 762 and 763 in operation until the stop switch 742 is again actuated.

The blower motor 776 is energized through the wires 777, 778 and 779 connected to the main line wires 708, 709 and 711, respectively. The wires 777, 778 and 779 each connects with its respective contactor 781, 782 and 783. Oppositely spaced contactors 781a, 782a and 783a are, in turn, connected by their respective wires 781b, 782b and 783b to said blower 776. The wires 781b and 783b are provided each with a fuse 784. A pilot light 786 is mounted on the wires 787 and 788, which, in turn, are respectively connected with the wires 781b and 783b, whereby it will be lighted at all times when the blower 776 is operating.

The contactors 749 and 749a when closed allow the current to by-pass the start switch 743, forming a completed circuit to the holding coil 753, which will magnetically hold the contactors 781, 782 and 783 in electrical contact with their respective contactors 781a, 782a and 783a. This arrangement maintains the blower 776 in operation until its stop switch 742 is again actuated.

*The Conveyor Circuits*

The conveyor motor 845, solenoid dump valve 608, solenoid clutch 805 and step down transformer 874 secure their power from the lines 801, 802 and 711. The lines 801 and 802 are, in turn, connected respectively to the main lines 708 and 709. The lines 801, 802 and 711 have at their opposite ends, respectively, a series of magnetically operable contactors 806, 807 and 808. This relay has an extra pair of spaced magnetic contactors 811 and 812.

The main line wire 708 has a series of switches 821, 607, 823 and 824 connected in series. The switch 821 is a normally closed safety limit switch mounted adjacent the entrance of the proofing chamber 81, and is so mounted that a normal tray 40 will pass underneath the same without actuating it. However, if a tray 40 has been introduced into the system that is warped out of its normal horizontal plane, or a second tray tends to ride over its preceding tray, the warped or second tray will engage the projecting operating arm of this switch, de-energizing the circuit and stopping the machine.

The switch 607 is a conventional low pressure air control means for the air system. This switch 607 is open normally, but, when the machine is in operation and the air pressure falls below the minimum setting of said switch, such pressure will close the same, allowing current to pass therethrough and to the stop switches 823 and 824. When either or both of the stop switches 823 or 824 are energized, they will open and cut off the electricity and the machine will stop.

The stop switches 823 and 824 are mounted at opposite ends of the machine, and, when either is manually opened, the operation of the machine will be halted.

The current after passing through the stop switch 824 passes through a wire 826 leading to a plurality of spaced pairs of parallel switches 827, 827a, 828 and 828a, 829 and 829a, and 831 and 831a, which are connected in series.

The switch 827 is located at the entrance of the proofing chamber, and the switch 827a is mounted adjacent the rear end of the indexing chain conveyor 121 operating under the former 120. The switch 827a has an arm in position to be engaged by the lugs 124 of said indexing chains 123 so that it is actuated each time a chain lug 124 passes thereby. These switches 827 and 827a are closed normally, and are set up to be actuated at different times. However, should both switches 827 and 827a be opened at the same time, the machine will stop since their respective operations will be out of proper timing.

The next pair of safety switches 828 and 828a, which are normally open, has its switch 828 positioned adjacent the forward end of the loading conveyor operating under the proofing chamber. The switch 828 is actuated by the lugs 163 on the indexing chain 161. The switch 828a is mounted adjacent the pilot arm 657 of the pilot valve 656 (see FIGURES 18 and 19). These switches 828 and 828a are alternately closed in their normal operation, but it will be obvious that, if both are opened during the same period, the machine will stop because of the shutting off of its electric current. This can happen only when the indexing conveyor 121 and/or ascending elevator 240 are out of proper sequential timing with respect to the loading conveyor 160.

The next pair of safety switches 829 and 829a, which are also normally open, are located at the bottom of the gravity tray return conveyor intermediate its ends. These switches are actuated and closed by the movement of the trays along the gravity return conveyor, and, when both are not being actuated from an open position to a closed position by empty trays passing along the conveyor, the switches 829 and 829a will remain open, shutting off the current operating the conveyors. This arrangement insures that a sufficient supply of empty trays 40 will be on the gravity conveyor 470 at all times for the continued operation of the machine.

The pair of safety switches 831 and 831a, which are normally closed, are mounted adjacent the receiving end of the gravity conveyor. When both switches are actuated, that is are opened, it will indicate the presence of too many trays 40 in the system and all of the conveyor mechanisms will be shut down for manual remedying of the situation.

The switches 832 and 832a are normally open, and are manually operated pushbottom starting switches. One is located adjacent each end of the machine. It will be obvious that the conveyor systems will be energized with the manual closing of either one of them. Such closing of the holding coil 841 will cause energization of its circuit, which, in turn, will cause the contacter 806 to close with its opposite contacter 806a, passing current through the fuse 842 and into the line 843; the contacter 807 to close with its contacter 807a, passing current into the line 846 leading to the motor 845; and the contacter 808 to close with its opposite contacter 808a, passing current through the fuse 847 and into the line 848 leading to the motor 845.

When the motor 845 is operating, it will be apparent that the circuit formed through the wires 851 and 852 will also be energized. The circuit formed by the wires 853 and 854 is also energized, and, in turn, energizes the solenoid valve 608 which will allow air to enter the airlines to the air motors. See FIGURE 26.

The line 851 has a line 861 leading therefrom, through a fuse 862 and the wire 863 to one side of a conventional solenoid operated clutch 865. (See FIGURES 7 and 8). The line 851 has a pilot light 863 mounted therein, which, in turn, connects with the line 852. A line 864, extending from the line 852, passes through a fuse 866 and through the wire 867, and connects with the opposite terminal of the solenoid operated clutch 865. A pilot light 868 is mounted in the circuit by means of the connecting wires 869 and 871.

The line 852 beyond its junction with the line 864 has a fuse 872, whose opposite end connects with a wire 873, leading to one side of a conventional step-down transformer 874, having a ground 875.

A line 876, connected with the line 861, has a fuse 877 mounted therein, which connects with a wire 878, leading to the opposite side of the transformer 874. A pilot light 879 is connected into the circuit to the transformer 874 through the wires 881 and 882.

The transformer 874 provides a low-voltage circuit for operating the solenoid valves controlling the operations of the formers. The low voltage transformer 874 has a hot line 886 leading therefrom to a switch 887, which is operated by the crank arm of the doughnut former 120. The switch 887, in turn, is connected by a wire 888 to the solenoid valve 619, which controls the return stroke of the formers 120. The solenoid valve has a ground line 889, leading therefrom back to the transformer 874, thereby forming a complete electric circuit.

A second circuit is connected in parallel with the above described circuit, and consists of a wire 891, leading to a limit switch 892, located in the air motor 681; the switch 892 has a wire 893 leading therefrom to a second switch 894, which is a manually operable toggle switch that permits the formers 120 to be stopped while the rest of the machine is being operated; the toggle switch 894 has a wire 896 leading therefrom to a third switch 897, which is a safety limit switch mounted above the trays entering under the formers 120. These switches 892, 894 and 897 are all normally open and are connected in series with each other. The return wire 898, leading from the opposite side of the switch 897 is connected to the solenoid valve 618 which, in turn, controls the forward or work stroke of the formers 120. The solenoid valve 618 has its electric circuit completed through the wire 899 connected to the ground wire 889.

A conventional counter 901 is connected in parallel with the solenoid valve 618 by means of the wires 902 and 903, and serves to record the number of cutting operations made by the formers 120.

*The Flour Sifter*

It has been found advisable in the operation of the machine in view of the continuous use of the trays 40, cycle after cycle, to dust their slats 48 once during each cycle to make certain the raw dough forms 45 do not have a tendency to adhere thereto at the time they are to be discharged therefrom.

In order to accomplish this dusting operation, a flour sifter 916 is mounted transversely of the speed conveyor belt 92 immediately adjacent the dough former 120 in any suitable manner. The sifter 916 is of a conventional construction, and its details are shown and decribed in United States Letters Patent No. 2,713,958, issued July 26, 1955, to Ernest J. Roth, one of the co-inventors of the present application.

Referring now to FIGURE 4, the sifter 916 consists of an elongated bin 917, having downwardly sloping sidewalls, a wide open top adapted to be closed by a hinged cover plate 918 and a narrow slotted bottom 919, which has a conventional flour sifting screen (not shown) mounted thereover.

A shaft 921 is mounted lengthwise of the bin 917 above its open bottom. One end of the shaft 921 extends outwardly from the bin 917, as best shown in FIGURE 3, and has a slotted cam arm 922 keyed thereto, which, in turn, has one end of a lever 923 connected thereto. The opposite end of the lever 923 is secured to a sprocket wheel 924 in an eccentric position, whereby each turn of said wheel 924 imparts a turning motion to the arm 922, which, in turn, rotates the shaft 921, whereby rotating the mixing rods (not shown), which causes flour to be discharged through the sifting screen covering the open bottom onto the slat 48 of the tray 40 aligned therebelow.

The sprocket wheel 924 mounted freely on a shaft 925 entrains one end of a chain 926, whose opposite end enmeshes a second sprocket wheel 927 keyed to a shaft 928. The shaft 928 also has a relatively small sprocket wheel 929 keyed thereto, which enmeshes one end of a second chain 931, whose opposite end is trained over a sprocket wheel 932 keyed to the shaft 127.

It will thus be apparent that when the shaft 127 is operating, the sifter 916 will also be operated. However, when the machine is being used as a cooling medium, the sifter 916 does not have to be mechanically disconnected, but its bin 917 may be left empty of flour, thus eliminating this unnecessary operation.

*The Operation of the Machine*

In describing the operation of the machine, it will be assumed that the same is empty of trays 40 and its current is turned off. It is not believed necessary to repeat in detail each mechanical function of each part of the machine, since such functions should be understood and obvious from the descriptions already given in connection with their constructions.

The operating power for the machine may be turned on or off at either end of said machine by pushing the appropriate buttons 823 or 824, and the operation of the machine my likewise be stopped by merely pushing either of the stop buttons 832 or 832a. See FIGURE 2.

To fill the machine with a sufficient quantity of trays 40, it is preferably desirable to insert them at the beginning of the gravity roller conveyor 470, because this conveyor must be filled with a sufficient number of trays 40 to keep the operating arms of the limit switches 829, 829a and 831a in operating positions. The limit switch 831a is connected in parallel with the limit switch 831 (see FIGURE 27), and both are normally closed. There are too many trays in the machine when the conveyor 470 is filled to such an extent that the sides of the trays in the line extend past the limit switches 831 and 831a, whose respective limit arms will be forced into their open positions by contracting said trays. Since the limit switches 831 and 831a are connected in parallel as shown in FIGURE 27, it follows that when both switches are opened at the same time, the machine will come to a stop for lack of electrical power.

The limit switches 829 and 829a, which are mounted in spaced positions adjacent the sides of the gravity roller conveyor 470, are normally open. These switches are actuated and closed by the movement of the trays 40 thereby. When both of these switches are not being so actuated, the one remaining open will shut off the current operating the conveyors. This arrangement insures a sufficient supply of trays 40 on the gravity roller conveyor 470 to start and operate the machine.

The safety limit switch 897 controls the operation of the solenoid valve 618 operating the dough formers 120. This switch 897 is normally open, but will be closed by a tray 40 in receiving position under the formers 120. Thus, the formers 120 cannot be operated to discharge dough forms 45 unless a tray 40 is properly positioned therebelow to catch the raw forms 45.

The limit switch 827a, which is normally closed, is mounted with its operating arm directly in the path of the lugs 124 of the conveyor indexing chain 123, which controls the movement of the trays 40 under the dough formers 120. The limit switch 827, which is also normally closed, is mounted in front of the entrance to the proofing or cooling chamber 81. Its arm is adapted to be actuated by a tray 40. When both switches 827 and 827a are actuated at the same time, they will indicate that their respective indexing chains moving their respective trays are out of proper timing sequence.

The limit switch 821, which is normally closed, is so mounted above the conveyor entrance to the proofing or cooling chamber 81, that its depending actuating arm will only be contacted by a tray that is too high for passage through the machine. Its height may be due to warpage of the tray, its being bent out of its normal horizontal plane or the tray may be trying to over-ride the next preceding tray. When the actuating arm of the switch 821 is engaged by such a tray, the switch is opened and the machine stops.

The limit switch 828 (FIGURE 2) has its arm extending into the path of the indexing lugs 163 of the conveyor 160, and the operating arm of the limit switch 828a (see FIGURE 18) is positioned to be operated by the pilot arm 657 of the pilot valve 656. These switches 828 and 828a are closed alternately in their normal operation, and, if both are opened at the same time, the machine will stop, indicating the indexing conveyor 121 and/or the ascending elevator 240 are out of proper sequential timing with the loading conveyor 160.

With the machine in proper operation, the raw dough forms 45 are deposited on the slats 48 of the tray 40 by the dough formers 120, carried into the proofing chamber 81, loaded onto a shelf of the ascending elevator 240, carried to the top of said elevator in said proofing chamber, shifted by the top transfer conveyor 291 onto the descending elevator 241.

When the trays 40 of proofed dough forms 45a reach the bottom of their travel downwardly on the descending elevator 241, they are deposited on the continuously driven belt 330, whereupon they are engaged by lugs 354 of the guide chains 356 and 357, which form the conveyor 359. The lugs 354 move the loaded trays 40 onto a second belt conveyor 381, whereby they are carried into and through the discharge station 391.

In passing through the discharge station 391, one of the knurled rollers 56 of the slats 48 will be brought into frictional camming engagement with the cam track 392, which will cause said roller 56 to rotate, thereby flipping or turning its slat 48 in an arc of 180 degrees and gravitationally discharge its proofed forms 45a onto the canvas belt 381 operating therebelow. The canvas belt 381 delivers the proofed dough forms 45a into the cooking vessel 532, wherein they are deep-fat fried in a conventional manner.

The emptied trays 40 remain in their horizontal position and are carried forwardly by the lugs 354 onto the supporting platform 418. (See FIGURE 31). The conveyor 435 operating thereover has depending lugs 434 which push the trays 40 onto the trackway 441. Operating above the trackway 441 is another chain conveyor 451, having depending lugs 463, which engage an edge of the tray 40 and moves it onto the conventional gravity roller conveyor 470, thereby completing one cycle through the machine.

It should be obvious that, if the machine is desired to be used as a cooling medium instead of a proofer, this can be done very easily. It is only necessary to leave the sifter 916 empty of flour, leave the dough out of the hopper of the dough former 120 and turn-off the heaters 761, 762 and 763 in the proofing chamber 81.

When the cooled dough forms 45a are discharged from the trays 40, they may be carried by the canvas belt 381 to their next operation (not shown) instead of being delivered to the cooking vessel 532. The next operation may be the glazing or coating of the articles, sugaring of them or merely packaging, as desired.

While the present embodiment of the invention shows and describes the use of hydraulic operating parts, it will be apparent that the necessary movements can be obtained by other equivalent mechanical means or by conventional start-and-stop electric motors. Applicants do not intend to claim the method of movement shown and described, but only the sequential timing and arrangement of the several moving parts thereof.

It will also be apparent that each of the trays 40 do not necessarily have to have a plurality of spaced slats 48, but could embody only one slat that pivots to a discharging position as it passes the discharge station.

Although we have shown and described but one form which the invention may assume, it will be readily apparent to those skilled in the art that the invention is not to be so limited, but that various other and further modifications may be made therein without departing from the spirit thereof or from the scope of the appended claims.

What we claim is:

1. In an endless automatic machine of the class described, the combination with a plurality of trays having a plurality of spaced slats mounted pivotally therein and adapted to successively receive a plurality of dough forms, each slat having a member for pivoting the same independently of the remaining slats, a dough former, indexing conveyor means for moving said trays under said dough former, means for operating said former when a slat of a tray is positioned thereunder, loading conveyor means for advancing a loaded tray into a proofing chamber, said proofing chamber having an ascending elevator for carrying the trays to the top thereof, means adjacent the top of said chamber for transferring a tray from said ascending elevator to a descending elevator, a descending elevator for lowering said trays to a removing conveyor, a removing conveyor for removing the trays from the descending elevator and advancing them through a discharge station having means adapted to engage said member on each of said slats for successively pivoting the same to discharge the proofed forms therefrom, means for receiving the discharged dough forms and advancing them to their next operation, conveyor means for returning the empty trays to said dough former for reloading, means for indicating when there are too many trays in the machine, and means for synchronizing the various means of the machine.

2. In an endless automatic machine of the class described, the combination with a plurality of trays having a plurality of spaced slats mounted pivotally therein and adapted to successively receive a plurality of dough forms, each slat having a member for pivoting the same independently of the remaining slats, a dough former, indexing conveyor means for moving said trays under said dough former, means for operating said former when a slat of a tray is positioned thereunder, loading conveyor means for advancing a loaded tray into a proofing chamber, said proofing chamber having an ascending elevator for carrying the trays to the top thereof, means adjacent the top of said chamber for transferring a tray from said ascending elevator to a descending elevator, a descending elevator for lowering said trays to a removing conveyor, a removing conveyor for removing the trays from the descending elevator and advancing them through a discharge station, said discharge station having means adapted to successively engage said member on each of said slats for pivoting the same to discharge the proofed forms therefrom, means for receiving the discharged dough forms and advancing them to their next operation, conveyor means for returning the empty trays to said dough former for reloading, means including a switch for stopping the dough former while permitting the rest of the machine to continue to operate, and means for synchronizing the various means of the machine.

3. In an endless automatic machine of the class described, the combination with a plurality of trays having a plurality of spaced slats mounted pivotally therein and adapted to successively receive a plurality of dough forms, each slat having a member for pivoting the same independently of the remaining slats, a dough former, indexing conveyor means for moving said trays under said dough former, means for operating said former when a slat of a tray is positioned thereunder, loading conveyor means for advancing a loaded tray into a proofing chamber, said proofing chamber having an ascending elevator for carrying the trays to the top thereof, means adjacent the top of said chamber for transferring a tray from said ascending elevator to a descending elevator, a descending elevator for lowering said trays to a removing conveyor, a removing conveyor for removing the trays from the descending elevator and advancing them through a discharge station, said discharge station having means adapted to successively engage said member on each of said slats for pivoting the same to discharge the proofed forms therefrom, means for receiving the discharged dough forms and advancing them to their next operation, conveyor means for returning the empty trays to said dough former for reloading, and means mounted above the indexing conveyor adjacent the entrance to said proofing chamber adapted to be actuated by a tray projecting out of its normal horizontal plane to stop the machine.

4. In an endless automatic machine of the class described having an air-pressure feed system, the combination with a plurality of trays having a plurality of spaced slats mounted pivotally therein and adapted to successively receive a plurality of dough forms, each slat having a member for pivoting the same independently of the remaining slats, a dough former having a hopper from which dough is extruded by said air pressure feed system, indexing conveyor means for moving said trays under said dough former, means for operating said former when a slat of a tray is positioned thereunder, loading conveyor means for advancing a loaded tray into a proofing chamber, said proofing chamber having an ascending elevator for carrying the trays to the top thereof, means adjacent the top of said chamber for transferring a tray from said ascending elevator to a descending elevator, a descending elevator for lowering said trays to a removing conveyor, a removing conveyor for removing the trays from the descending elevator and advancing them through a discharge station, said discharge station having means adapted to successively engage said member on each of said slats for pivoting the same to discharge the proofed forms therefrom, means for receiving the discharged dough forms and advancing them to their next operation, conveyor means for returning the empty trays to said dough former for reloading, and means in the form of a low pressure air control switch for stopping said machine when the air pressure in its air pressure feed system falls below normal operating pressure.

5. In an endless automatic machine of the class described, the combination with a plurality of trays having a plurality of spaced slats mounted pivotally therein and adapted to successively receive a plurality of dough forms, each slat having a member for pivoting the same independently of the remaining slats, a dough former, indexing conveyor means for moving said trays under said dough former, means for operating said former when a slat of a tray is positioned thereunder, loading conveyor means for advancing a loaded tray into a proofing chamber, said proofing chamber having an ascending elevator for carrying the trays to the top thereof, means adjacent the top of said chamber for transferring a tray from said ascending elevator to a descending elevator, a descending elevator for lowering said trays to a removing conveyor, a removing conveyor for removing the trays from the descending elevator and advancing them through a discharge station, said discharge station having means adapted to successively engage said member on each of said slats for pivoting the same to discharge the proofed forms therefrom, means for receiving the discharged dough forms and advancing them to their next operation, conveyor means for returning the empty trays to said dough former for reloading, and means for stopping the machine when said indexing conveyor and said ascending elevator are out of proper sequential timing.

6. In an endless automatic machine of the class described, the combination with a plurality of trays having a plurality of spaced slats mounted pivotally therein and adapted to successively receive a plurality of dough forms, each slat having a member for pivoting the same independently of the remaining slats, a dough former, indexing conveyor means for moving said trays under said dough former, means for operating said former when a slat of a tray is positioned thereunder, loading conveyor means for advancing a loaded tray into a proofing chamber, said proofing chamber having an ascending elevator for carrying the trays to the top thereof, means adjacent the top of said chamber for transferring a tray from said ascending elevator to a descending elevator, a descending elevator for lowering said trays to a removing conveyor, a removing conveyor for removing the trays from the descending elevator and advancing them through a discharge station, said discharge station having means adapted to successively engage said member on each of said slats for pivoting the same to discharge the proofed forms therefrom, means for receiving the discharged dough forms and advancing them to their next operation, conveyor means for returning the empty trays to said dough former for reloading, and spaced means associated with said return conveyor for stopping said machine when there are an insufficient number of trays in said return conveyor for a safe continuous operation of said machine.

References Cited in the file of this patent

UNITED STATES PATENTS

| | | |
|---|---|---|
| 1,763,812 | Olson | June 17, 1930 |
| 2,780,182 | Rand | Feb. 5, 1957 |
| 2,897,772 | Hunter | Aug. 4, 1959 |
| 2,919,824 | Roth | Jan. 5, 1960 |